United States Patent
Yun

(10) Patent No.: US 9,326,309 B2
(45) Date of Patent: Apr. 26, 2016

(54) METHOD AND APPARATUS FOR SUPPORTING COMMUNICATION OF MULTI-MODE TERMINAL

(71) Applicant: INTELLECTUAL DISCOVERY CO., LTD., Seoul (KR)

(72) Inventor: Ji Hoon Yun, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 14/264,623

(22) Filed: Apr. 29, 2014

(65) Prior Publication Data

US 2014/0323131 A1 Oct. 30, 2014

(30) Foreign Application Priority Data

| Apr. 30, 2013 | (KR) | 10-2013-0048953 |
| Apr. 30, 2013 | (KR) | 10-2013-0048954 |
| Apr. 30, 2013 | (KR) | 10-2013-0048956 |
| Apr. 30, 2013 | (KR) | 10-2013-0048957 |
| Apr. 30, 2013 | (KR) | 10-2013-0048958 |

(51) Int. Cl.
| *H04W 36/00* | (2009.01) |
| *H04W 76/02* | (2009.01) |
| *H04W 36/28* | (2009.01) |
| *H04W 88/06* | (2009.01) |
| *H04W 88/10* | (2009.01) |

(52) U.S. Cl.
CPC .......... *H04W 76/025* (2013.01); *H04W 36/28* (2013.01); *H04W 88/06* (2013.01); *H04W 88/10* (2013.01)

(58) Field of Classification Search
CPC ... H04W 76/025; H04W 36/28; H04W 88/06; H04W 88/10

USPC ........ 455/436, 435.2, 552.1, 553.1, 434, 444, 455/448; 370/328, 331
See application file for complete search history.

(56) References Cited

U.S. PATENT DOCUMENTS

| 7,751,850 | B2 * | 7/2010 | Karaoguz ................ 455/553.1 |
| 9,036,599 | B2 * | 5/2015 | Chin et al. .................. 370/331 |
| 2007/0070935 | A1 * | 3/2007 | Prakash et al. .............. 370/328 |
| 2008/0192681 | A1 * | 8/2008 | Lee et al. .................... 370/328 |
| 2010/0067434 | A1 * | 3/2010 | Siu et al. .................... 370/328 |
| 2010/0329161 | A1 * | 12/2010 | Ylanen et al. ............... 370/310 |
| 2013/0176897 | A1 * | 7/2013 | Wang et al. ................. 370/254 |
| 2013/0237226 | A1 * | 9/2013 | Periyalwar et al. ......... 455/436 |
| 2014/0148152 | A1 * | 5/2014 | Periyalwar et al. ....... 455/426.1 |
| 2014/0162620 | A1 * | 6/2014 | Geng et al. .................. 455/418 |
| 2014/0248862 | A1 * | 9/2014 | Periyalwar et al. ......... 455/418 |
| 2014/0254502 | A1 * | 9/2014 | Cai et al. .................... 370/329 |
| 2014/0274201 | A1 * | 9/2014 | Sun et al. .................. 455/552.1 |

FOREIGN PATENT DOCUMENTS

| WO | WO 2012/145706 | * 10/2012 | ............ H04W 36/22 |

* cited by examiner

*Primary Examiner* — Mong-Thuy Tran
(74) *Attorney, Agent, or Firm* — Sughrue Mion, PLLC

(57) ABSTRACT

Disclosed are various example embodiments of link connection for a multi-mode terminal. In an example embodiment, an operating method of multi-mode terminal comprises connecting a first type link with a first type access point of an integrated access point; reading link setup information corresponding to the integrated access point from a memory, wherein the link setup information is used for configuring a second type link according to a first configuration method; and connecting a second type link with a second type access point of the integrated access point based on the link setup information.

14 Claims, 12 Drawing Sheets

METHOD AND APPARATUS FOR SUPPORTING COMMUNICATION OF MULTI-MODE TERMINAL

CLAIM FOR PRIORITY

This application claims priorities to Korean Patent Application No. 10-2013-0048953 filed on Apr. 30, 2013, No. 10-2013-0048954 filed on Apr. 30, 2013, No. 10-2013-0048956 filed on Apr. 30, 2013, No. 10-2013-0048957 filed on Apr. 30, 2013, and No. 10-2013-0048958 filed on Apr. 30, 2013 in the Korean Intellectual Property Office (KIPO), the entire contents of which are hereby incorporated by references.

BACKGROUND

1. Technical Field

Example embodiments of the present invention relate to a multi-mode terminal, an integrated access point, and a heterogeneous communication system, and more specifically to methods for link setup, handover, transmission, and coverage matching for the multi-mode terminal, the integrated access point, and the heterogeneous communication system.

2. Related Art

Currently, an integrated base station (for example, an integrated femtocell base station) which integrates a cellular communication base station and a WiFi access point is being commercialized and disseminated. Meanwhile, there is plenty of room for improving performance of the corresponding system when advantages and disadvantages of the above both communication manners.

Therefore, various technologies such as link setup, handover, transmission, coverage matching, and the like may be needed for efficiently utilizing a multi-mode terminal, an integrated access point, and a heterogeneous communication system.

SUMMARY

In some example embodiment of the present invention, an operating method of a multi-mode terminal may comprise connecting a first type link with a first type access point of an integrated access point; reading link setup information corresponding to the integrated access point from a memory, wherein the link setup information is used for configuring a second type link according to a first configuration method; and connecting a second type link with a second type access point of the integrated access point based on the link setup information.

Here, the method may further comprise, when the link setup information corresponding to the integrated access point does not exist in the memory, connecting the second type link with the integrated access point according to a second configuration method, generating the link setup information, and storing the generated link setup information in the memory.

Here, the storing the generated link setup information in the memory includes storing the generated link setup information in the memory as mapped onto a first type access point identifier of the integrated access point, and the reading the link setup information includes reading the link setup information which is mapped onto the first type access point identifier of the integrated access point from the memory.

Here, a time needed for the first configuration method may be shorter than a time needed for the second configuration method.

Here, the first configuration method may be configured to comprise a part of all steps constituting the second configuration method.

Here, the first type link may be a cellular communication link, and the second type link may be a wireless local area network communication link.

Here, the first type access point may include a femtocell base station, and the second type access point may include a wireless fidelity (WIFI) access point, and the integrated access point may include an integrated femtocell base station.

In other example embodiment of the present invention, an operating method of an integrated access point may comprise reading link setup information corresponding to the multi-mode terminal from a memory, wherein the link setup information is used for configuring a second type link according to a first configuration method; and connecting a second type link with the multi-mode terminal based on the link setup information.

Here, the method may further comprise, when the link setup information corresponding to the multi-mode terminal does not exist in the memory, connecting the second type link with the multi-mode terminal according to a second configuration method, generating the link setup information, and storing the generated link setup information in the memory.

Here, the storing may include storing the generated link setup information in the memory as mapped onto a first type terminal identifier of the multi-mode terminal, and the reading includes reading the link setup information which is mapped onto the first type terminal identifier of the multi-mode terminal from the memory.

In other example embodiment of the present invention, an apparatus may comprise a first type communication part capable of communicating with a first type terminal; a second type communication part capable of communicating with a second type terminal; a memory storing link setup information used for configuring a second type link with the second type terminal according to a first configuration method; and a control part reading link setup information corresponding to a multi-mode terminal from the memory, and controlling the second type communication part to connect the second type link with the multi-mode terminal based on the link setup information, when a first type link with the multi-mode terminal is connected through the first type communication part.

Here, when the link setup information corresponding to the multi-mode terminal does not exist in the memory, the control part may control the second type communication part to connect the second type link with the multi-mode terminal according to a second configuration manner, generate the link setup information, and store the generated link setup information in the memory. Also, the control part may determine whether link setup information mapped onto a first type terminal identifier of the multi-mode terminal provided from the first type communication part exists in the memory, and store the generated link setup information in the memory as mapped onto the first type terminal identifier.

In other example embodiment of the present invention, an apparatus may comprise a first type communication part capable of performing a first type communication; a second type communication part capable of performing a second type communication; a memory storing link setup information used for configuring a second type link with the second type terminal according to a first configuration method; and a control part reading link setup information corresponding to an integrated access point from the memory, and controlling the second type communication part to connect the second type link with the integrated access point based on the link setup information, when a first type link with the integrated access point is connected through the first type communication part.

Here, when the link setup information corresponding to the integrated access point does not exist in the memory, the control part may control the second type communication part to connect the second type link with the integrated access point according to a second configuration manner, generate the link setup information, and store the generated link setup information in the memory. Also, the control part may determine whether link setup information mapped onto a first type access point identifier of the integrated access point provided from the first type communication part exists in the memory, and store the generated link setup information in the memory as mapped onto the first type access point identifier.

Also, in other example embodiment of the present invention, an operating method of a multi-mode terminal may comprise receiving a handover command for a first type link from a source integrated access point including a first type access point and a second type access point which respectively has a connected link through a first type communication; and performing handover for a first type link and a second link in response to the receipt of the handover command.

Here, the performing handover may comprise obtaining information on a first type access point of a target integrated access point; and connecting a link with a second type target access point of the target integrated access point based on the obtained information.

Here, the information on the first type access point of the target integrated access point may include a first type access point identifier of the target integrated access point.

Here, the connecting the link with the second type target access point may include reading link setup information corresponding to the target integrated access point from a memory, wherein the link setup information is used for configuring a second type link according to a first configuration method; and connecting a second type link with the integrated access point based on the link setup information.

Here, the method may further comprise, when the link setup information corresponding to the target integrated access point does not exist in the memory, connecting the second type link with the integrated access point according to a second configuration method, generating the link setup information, and storing the generated link setup information in the memory.

Here, the storing the generated link setup information in the memory includes storing the generated link setup information in the memory as mapped onto a first type access point identifier of the integrated access point, and the reading the link setup information includes reading the link setup information which is mapped onto the first type access point identifier of the integrated access point from the memory.

Here, a time needed for the first configuration method may be shorter than a time needed for the second configuration method.

Here, the first configuration method may be configured to comprise a part of all steps constituting the second configuration method.

Here, the performing handover may include releasing the first and second type links with the source integrated access point.

Here, the first type link may be a cellular communication link, and the second type link may be a wireless local area network communication link.

Here, the first type access point may include a femtocell base station, and the second type access point may include a wireless fidelity (WIFI) access point, and the integrated access point may include an integrated femtocell base station.

Also, in other example embodiment of the present invention, an operating method of an integrated access point may comprise receiving a handover command for a first type link of a multi-mode terminal through a first type communication; and performing handover for the first and second type links of the multi-mode terminal in response to the receipt of the handover command.

Here, the performing handover may include connecting a first type link with a multi-mode terminal; obtaining link setup information corresponding to the multi-mode terminal, wherein the link setup information is used for configuring a second type link according to a first configuration method; and connecting a second type link with the multi-mode terminal based on the link setup information.

Here, the link setup information may be obtained from the source integrated access point.

Here, the obtaining the link setup information may include reading the link setup information from a memory.

Here, the method may further comprise, when the link setup information corresponding to the multi-mode terminal does not exist in the memory, connecting the second type link with the multi-mode terminal according to a second configuration method, generating the link setup information, and storing the generated link setup information in the memory.

Here, the storing may include storing the generated link setup information in the memory as mapped onto a first type terminal identifier of the multi-mode terminal, and the reading includes reading the link setup information which is mapped onto the first type terminal identifier of the multi-mode terminal from the memory.

Also, in other example embodiment of the present invention, an operating method of an integrated access point may comprise transmitting a handover command for a first type link of a multi-mode terminal to a first type access point of a target integrated access point; and releasing the first and second type links to the multi-mode terminal.

Here, the method may further comprise transmitting the link state information corresponding to the multi-mode terminal to a first type access point of the target integrated access point, wherein the link state information is used for connecting the second type link according to a first configuration method.

Also, in other example embodiment of the present invention, an operating method of an integrated access point may comprise obtaining link state information of a first type link connected to a multi-mode terminal, selecting one of methods for transmission to the multi-mode terminal based on the link state information, wherein the methods for transmission may include data transmission using only the first type communication and distributed data transmission using both the first type and second type communications.

Here, the link state information may include load, service quality, and interference level of the first type link.

Here, the selecting may include performing the data transmission using only the first type communication when state of the first type like is better than a preconfigured threshold.

Here, the performing the data transmission using only the first type communication may include transmitting a remote control command to inactivate a second type communication part of the multi-mode terminal through the first type communication.

Here, the selecting may include performing the distributed data transmission using both the first type and second type communications when the state of the first type like is worse than a preconfigured threshold.

Here, the performing the distributed data transmission using both the first type and second type communications may include transmitting a remote control command to activate the second type communication part of the multi-mode terminal through the first type communication.

Here, the first type communication is a cellular communication, and the second type communication is a wireless local area network communication.

Also, in other example embodiment of the present invention, an apparatus according to other aspect of the present invention may comprise a first type communication part capable of performing a first type communication; a second type communication part capable of performing a second type communication; and a control part selecting one of methods for transmission to a multi-mode terminal based on state information of a first type link connected to the multi-mode terminal, wherein the methods may include data transmission using only the first type communication and distributed data transmission using both the first type and second type communications.

Here, the control part may receive the state information from the first type communication part. Also, the control part may control the first type communication part to perform the data transmission using only the first type communication when state of the first type like is better than a preconfigured threshold. Also, the control part may control the first type communication part to transmit a remote control command to inactivate a second type communication part of the multi-mode terminal. Also, the control part may control the first and second type communication parts to perform the data transmission using both the first type and second type communications when the state of the first type like is worse than a preconfigured threshold. Also, the control part may control the first type communication part to transmit a remote control command to activate the second type communication part of the multi-mode terminal.

Here, the first type communication is a cellular communication, and the second type communication is a wireless local area network communication.

Here, the first type communication part may include a femtocell base station, and the second type communication part may include a WIFI access point.

Also, in other example embodiment of the present invention, an apparatus according to other aspect of the present invention may comprise a first type communication part capable of performing a first type communication; a second type communication part capable of performing a second type communication; and a control part receiving data transmitted dispersively from the integrated access point from the first and second type communication parts, aggregating the data, and performing upper layer processes on the aggregated data.

Here, the control part may aggregate the data when the first type communication part receives a message notifying distributed data transmission from the integrated access point. Also, the control part may inactivate the second type communication part when the first type communication part receives an inactivation command for the second type communication part from the integrated access point.

Also, in other example embodiment of the present invention, an apparatus according to other aspect of the present invention may comprise a first type communication part capable of performing a first type communication; a second type communication part capable of performing a second type communication; and a control part controlling the first type communication part and the second type communication part, wherein the control part inactivates the second type communication part when the first type communication part receives an inactivation command for the second type communication part from the integrated access point.

Also, in other example embodiment of the present invention, an operating method of an integrated access point may comprise receiving coverage determination information for determining coverages of a first type communication and a second type communication from a multi-mode terminal; and determining whether the multi-mode terminal is located with a first type coverage and whether the multi-mode terminal is located within a second type coverage based on the received information.

Here, the method may further comprise changing at least one of the first type coverage and the second type coverage based on result of the determination.

Here, the method may further comprise transmitting at least part of data, to be transmitted through the first type link, through the second type link to the multi-mode terminal while performing a handover of the first type link, when it is determined that the multi-mode terminal is out-of the first type coverage, but in the second type coverage.

Here, the method may further comprise increasing the second type coverage; and transmitting at least part of data, to be transmitted through the first type link, through the second type link to the multi-mode terminal while performing the handover of the first type link.

Here, the coverage determination information for determining coverages of a first type communication and a second type communication may include information on strengths of the first type communication signal and the second type communication signal which the multi-mode terminal receives.

Here, the first type communication is a cellular communication, and the second type communication is a wireless local area network communication.

Also, in other example embodiment of the present invention, an operating method of a multi-mode terminal may comprise obtaining coverage determination information for determining coverages of a first type communication and a second type communication; and transmitting the obtained information to an integrated access point.

Here, the obtained information may be information used for determining whether the multi-mode terminal is located with a first type coverage (coverage of the first type communication) and whether the multi-mode terminal is located within a second type coverage (coverage of the second type communication).

Here, the method further comprise receiving at least part of data, to be received through the first type link, through the second type link from the integrated access point while performing a handover of the first type link.

Here, the coverage determination information for determining coverages of a first type communication and a second type communication may include information on strengths of the first type communication signal and the second type communication signal which are received from the integrated access point.

Here, the obtained coverage determination information may be transmitted by using the first type communication.

Here, among the obtained coverage determination information, information used for determining the first type coverage may be transmitted through the first type communication, and information used for determining the second type coverage may be transmitted through the second type communication.

Here, the first type communication is a cellular communication, and the second type communication is a wireless local area network communication.

Also, in other example embodiment of the present invention, an operating method of an integrated access point may comprise classifying data into high priority data and low priority data; and transmitting simultaneously the high priority data through a first type communication and the low priority data through a second type communication.

Here, the first type communication is a cellular communication, and the second type communication is a wireless local area network communication. Here, the data may include video data. In this case, the high priority data may include intra-coded (I) frame, and the low priority data may include predictive-coded frame (P) frame and bidirectional-code (B) frame. Alternatively, the high priority data may include I frame and P frame, and the low priority data may include B frame.

Also, in other example embodiment of the present invention, an operating method of an integrated access point may comprise classifying data into high priority data and low priority data; and transmitting simultaneously the high priority data through both the first and second type communications and the low priority data through the second type communication.

Here, the first type communication is a cellular communication, and the second type communication is a wireless local area network communication.

Also, in other example embodiment of the present invention, an operating method of an integrated access point may comprise (a) transmitting first priority data and second priority data through the first type communication; and (b) transmitting the second priority data through the second type communication in place of the first type communication when a quality of the first priority data transmission through the first type communication becomes lower than a preconfigured threshold.

Here, the step (a) may further include transmitting third priority data through the second type communication, and the step (b) may further include downgrading a service class of the third priority data into a lower service class of service classes of the second type communications.

Here, the first type communication is a cellular communication, and the second type communication is a wireless local area network communication. Also, the service classes may be the access classes according to the WIFI standard specification.

Also, in other example embodiment of the present invention, an operating method of an integrated access point may comprise (a) transmitting first priority data through the first type communication and second priority data through the second type communication; and (b) transmitting the second priority data through the first type communication in place of the second type communication when a quality of the first priority data transmission through the first type communication becomes higher than a preconfigured threshold.

Here, the step (a) may further include transmitting third priority data through the second type communication, and the step (b) may further include upgrading a service class of the third priority data into a higher service class of service classes of the second type communications.

Also, in other example embodiment of the present invention, an operating method of a multi-mode terminal may comprise receiving simultaneously high priority data through the first type communication and low priority data through the second type communication; aggregating the high priority data and the low priority data; and transferring the aggregated data to an upper layer.

Here, the first type communication is a cellular communication, and the second type communication is a wireless local area network communication.

Also, in other example embodiment of the present invention, an operating method of a multi-mode terminal may comprise receiving simultaneously high priority data through both the first type communication and the second type communication and low priority data through the second type communication; aggregating the high priority data and the low priority data; and transferring the aggregated data to an upper layer.

Also, in other example embodiment of the present invention, an operating method of a multi-mode terminal (a) receiving first priority data and second priority data through the first type communication; (b) receiving control information from an integrated access point and transmitting the second priority data through the second type communication in place of the first type communication according to the control information.

Here, the step (a) may further include transmitting third priority data through the second type communication, and the step (b) may further include receiving control information from the integrated access point; and receiving the third priority data by downgrading a service class of the third priority data into a lower service class of service classes of the second type communications according to the control information.

Also, in other example embodiment of the present invention, an operating method of a multi-mode terminal (a) receiving first priority data through the first type communication and second priority data through the second type communication; (b) receiving control information from an integrated access point and transmitting the second priority data through the first type communication in place of the second type communication according to the control information.

Here, the step (a) may further include transmitting third priority data through the second type communication, and the step (b) may further include receiving control information from the integrated access point; and receiving the third priority data by upgrading a service class of the third priority data into a higher service class of service classes of the second type communications according to the control information.

Also, in other example embodiment of the present invention, a computer-readable medium containing instructions may be provided. The instructions may be executed by a base station or a user terminal comprising at least one processor, and may be used for performing methods according to the above-described various aspects of the present This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations to solve any or all disadvantages noted in any part of this disclosures. In addition to the above-described example embodiments and features, further example embodiments, forms, and features will be clarified by referring to the following figures and explanations.

Example embodiments may have effects including advantages which will be described. However, it does not mean any example embodiment of the present invention should have all the advantages. Thus, the scope of the claimed subject matter is not limited to an example embodiment having all the advantages.

According to the example embodiments, a multi-mode terminal, an integrated access point, and a heterogeneous communication system may be utilized efficiently.

DESCRIPTION OF EXAMPLE EMBODIMENTS

Figure 1:
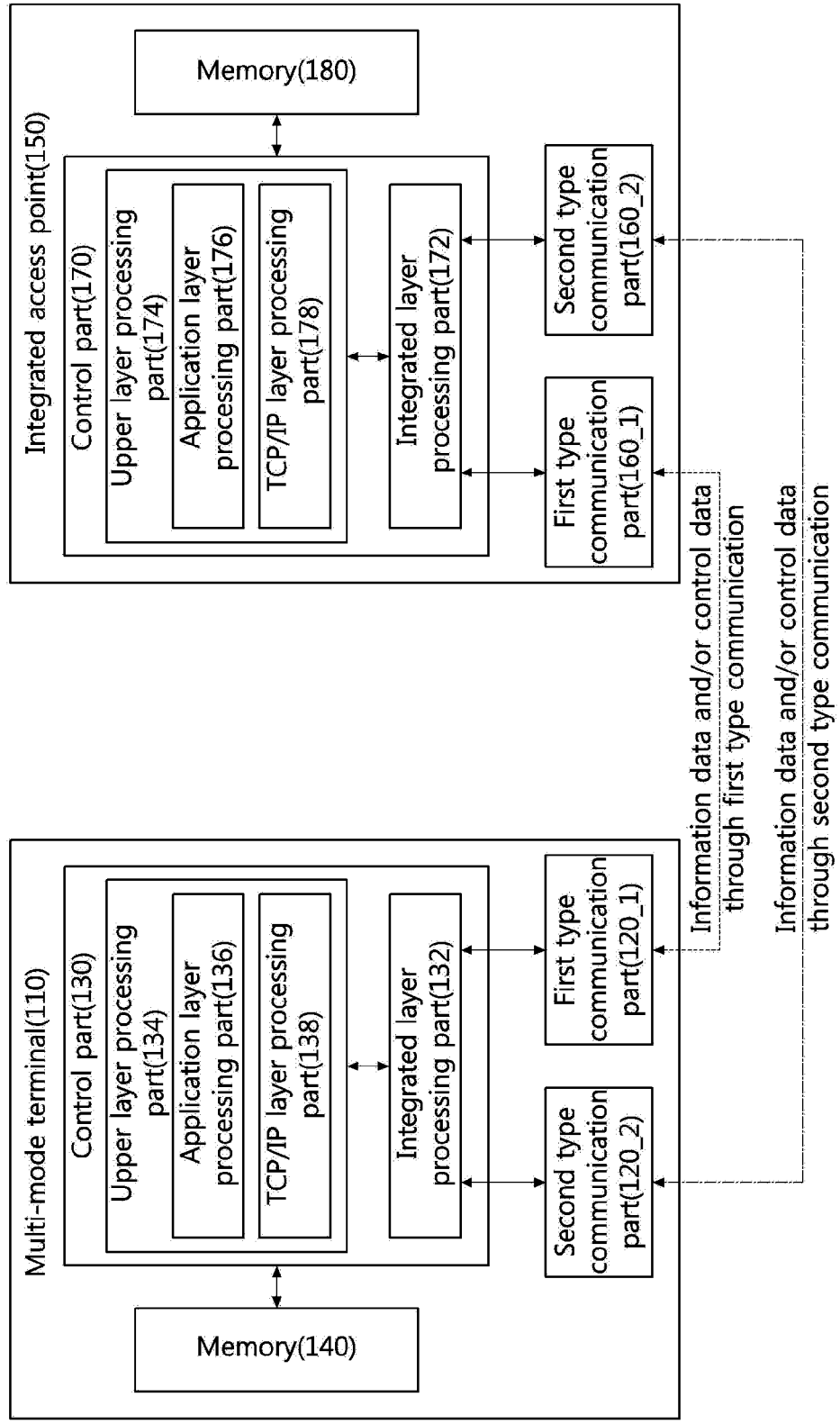
FIG. 1 illustrates a wireless network according to an example embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or score of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 illustrates a wireless network according to an example embodiment of the present invention.

Referring to FIG. 1, a wireless network 100 may comprise an integrated access point 150 and a multi-mode terminal 110.

In an example embodiment, the integrated access point 150 may comprise a first type communication part 160-1, a second type communication part 160-2, and a control part 170.

Each of the first and second type communication parts 160-1 and 160-2 may be a block (hardware or software, or a combination of them) for performing a corresponding type of communication. For example, a first type communication performed by the first type communication part 160-1 may be a cellular communication such as 3rd Generation Partnership Project (3GPP) Long Term Evolution (LTE), and a second type communication performed by the second type communication part 160-2 may be a near-distance communication such as a Wireless Fidelity (WiFi). For example, the first type communication part 160-1 may include a femtocell base station (HNB or HeNB) function, and the second type communication part 160-2 may include a WiFi Access Point (AP) function. The integrated access point 150 may be an integrated femtocell base station including both the communication parts.

The control part 170 may control the first type communication part 160-1 and the second type communication part 160-2. The control part 170 may include an integrated layer processing part 172 and an upper layer processing part 174. Also, the upper layer control part 174 may include a TCP/IP layer processing part 178 and an application layer processing part 176.

In other example embodiment, the integrated access point 150 may further include a memory 180 for storing various data. In this case, the control part 170 may control the memory 180 for writing data and/or reading data.

In an example embodiment, the multi-mode terminal 110 may include a first type communication part 120-1, a second type communication part 120-2, and a control part 130.

Similarly to the first type communication part 160-1 and the second type communication part 160-2, each of the first and second communication parts 120-1 and 120-2 may be a block (hardware or software, or a combination of them) for respectively performing the first and second type communications. For example, the multi-mode terminal may be a smart phone which is capable of a cellular communication and a wireless near distance communication.

The control part 130 may control the first type communication part 120-1 and the second type communication part 120-2. The control part 130 may include an integrated layer processing part 132 and an upper layer processing part 134. Also, the upper layer control part 134 may include a TCP/IP layer processing part 138 and an application layer processing part 136.

In other example embodiment, the multi-mode terminal 110 may further include a memory 140 for storing various data. In this case, the control part 130 may control the memory 140 for writing data and/or reading out data.

Figure 2:
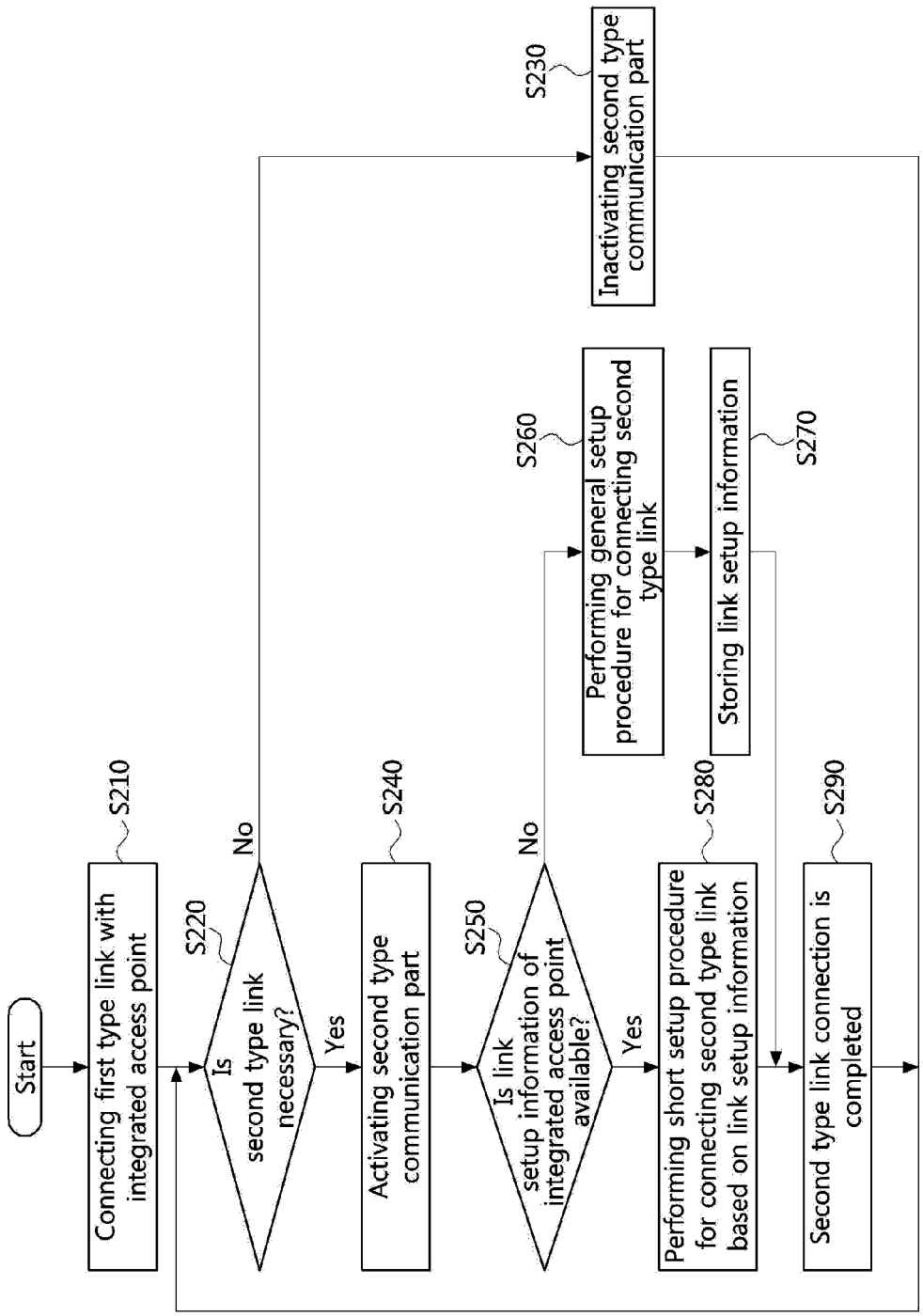
FIG. 2 is a flow chart explaining example embodiments for a link connection.

FIG. 2 is a flow chart explaining example embodiments for a link connection.

The example embodiments explained based on FIG. 2 may be performed by the multi-mode terminal and the integrated access point supporting the first and second type communications.

In order to help understanding, the example embodiments based on FIG. 2 are explained by referring to FIG. 1 as follows.

The multi-mode terminal 110 may perform communications with the integrated access point 150 by connecting a first type link (S210). The step S210 may be performed by the first type communication part 120-1 of the multi-mode terminal 110 and the first type communication part 160-1 of the integrated access point 150. For example, the first type link may be a cellular communication link. In the step S210, the multi-mode terminal 110 may obtain a first type access point identifier of the integrated access point 150. For example, the first type access point identifier may be a femtocell identifier.

The integrated layer processing part 132 of the multi-mode terminal 110 may determine whether a second type link needs to be connected (S220). For example, the second type link may be a WiFi communication link. Examples of cases that the second type link needs to be connected may be described as follows.

CASE A: when the first type link is connected initially or newly, the second type link may be automatically connected. For example, this case may be a case when the integrated layer processing part 132 of the multi-mode terminal 110 and the integrated layer processing part 172 of the integrated access point 150 are configured to operate in the above-described manner.

CASE B: The integrated access point 150 may determine necessity to configure the second type link on the basis of a status (for example, a channel state, an interference state, and a load) of the currently-connected first type link, and transmit an explicit command instructing the multi-mode terminal 110 to connect the second type link. For example, this case may be a case when the integrated layer processing part 132 of the multi-mode terminal 110 receives the explicit command instructing to configure the second type link from the integrated access point 150 via the first type communication part 120-1.

CASE C: The multi-mode terminal 110 may determine necessity to configure the second type link on the basis of a status (for example, a channel state, an interference state, and a load) of the currently-connected first type link. For example, the integrated layer processing part 132 of the multi-mode terminal 110 may make the above-described decision.

CASE D: This case is a case when a user inputs a command instructing the multi-mode terminal 110 to connect the second type link. For example, this case is a case when the integrated layer processing part 132 of the multi-mode terminal 110 is reported by a user interface (not depicted) of the multi-mode terminal 110 that the user command instructing to connect the second type link is inputted.

If it is not necessary to connect the second type link (S220), the multi-mode terminal 110 may maintain the second type communication part 120-2 in inactivated state (S230), and return to the step S220. Otherwise, if it is necessary to connect the second type link (S220), the multi-mode terminal 110 may activate the second type communication part 120-2 (S240). Examples of the activated state may include a state in which an operation of connecting the second type link can be performed, or a state in which link connection and general data communication can be performed. Also, examples of the inactivated state may include a state in which some parts (for example, a RF circuitry) or all parts of the second communication part 120-2 are not powered, or a state in which the communication part 120-2 is in the power saving mode (for example, although power is provided to the communication part 120-2, it consumes less power than when it is in the activated state). However, the activated state and the inactivated state may not be restricted to the above examples. The steps S230 and S240 may be performed under controls of the integrated layer processing part 132. Meanwhile, in other example embodiment where the second type communication part 120-2 always maintains the activated state, the steps S230 and S240 may not be performed. Also, the step S240 may be performed before the steps S280 and S260, or may be performed as included in the S280 and S260.

The multi-mode terminal 110 may identify, through the step S210, whether information of the connected integrated access point 150 for configuring a link is already obtained (S250). The information is referred to as 'link setup information'. The step S250 may be performed in the integrated layer processing part 132 of the multi-mode terminal 110 by querying contents of the memory 140. For example, the integrated layer processing part 132 may check whether the link setup information corresponding to the first type access point identifier exists in the memory 140. The link setup information may be used to reduce time or procedures required for connection setup of the second type link. In an example embodiment, if the second type link connection setup requires a scanning step, an authentication step, and an association step similarly to that of a WiFi link setup, the link setup information may be information necessary for shortening or omitting at least one of the above three procedures. The further explanation will be provided by referring to FIG. 3.

If the link setup information of the integrated access point 150 is not already obtained (S250), the multi-mode terminal 110 may perform a general setup procedure for setting up the second type link (S260). An example of the general setup procedure may be a procedure performing the scanning step, the authentication step, and the association step according to the IEEE 802.11 specification (for example, the IEEE 802.11-1999 specification) when the second type link is a WiFi link. The step S260 may be performed by the second type communication part 120-2 which receives a command instructing to connect the second type link from the integrated layer processing part 132.

The multi-mode terminal 110 may store the link setup information obtained through the step S260 for a later use (for example, a use in the step S280) (S270). In the S270, the integrated layer processing part 132 may receive the link setup information from the second type communication part 120-2, and store the link setup information mapped onto information about the first type access point (for example, the first type access point identifier) in the memory 140. In other example embodiment, the step S70 may be performed as merged into the step S260 differently from the example illustrated in FIG. 2.

When the link setup information of the integrated access point 150 is already obtained (S250), the multi-mode terminal 110 may perform a short setup procedure for connection setup of the second type link based on the obtained link setup information (S280). For example, when configuration of the second type link needs the scanning step, the authentication step, and the association step similarly to the WiFi link setup procedure, the short setup procedure may be a procedure in which at least one of the three steps is shortened or omitted temporally or procedurally. The step S280 may include a sub-step in which the integrated access point 150 reads out the first link setup information mapped to the first type access point identifier obtained in the S210 from the memory 140, and provides the second type communication part 120-2 with it and a command instructing to connect the second type link, and a sub-step in which the second type communication part 120-2 performs the short setup procedure based on the provided link setup information.

After the second type link connection is completed successfully through the step S270 or S280 (S290), the multi-mode terminal may return the step S220.

Figure 3:
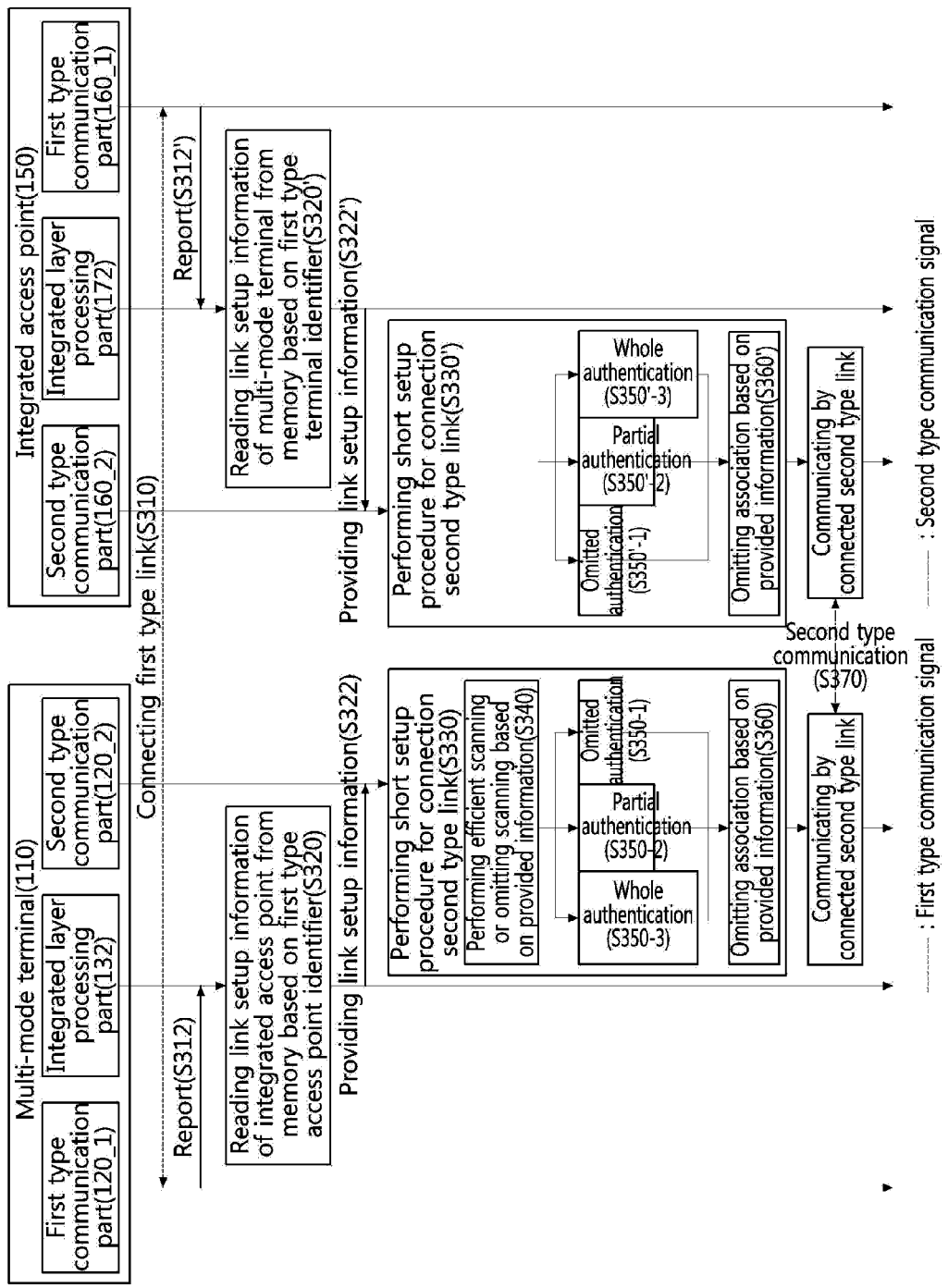
FIG. 3 illustrates an example of a procedure for shortening a link setup according to example embodiments.

FIG. 3 illustrates an example of a procedure for shortening a link setup according to example embodiments.

The example embodiments explained based on FIG. 3 may be performed by the multi-mode terminal and the integrated access point supporting the first type communication and the second type communication.

In order to help understanding, the example embodiments according to FIG. 3 will be explained by referring to FIGS. 1 and 2 as follows.

The first type communication part 120-1 of the multi-mode terminal 110 and the first type communication part 160-1 of the integrated access point 150 may perform the first type communication by connecting the first type link between them (S310). The S310 may correspond to the S210 of FIG. 2.

The first type communication part 120-1 of the multi-mode terminal 110 may report information about the connected first type link to the integrated layer processing part 132 (S312). For example, the information about the connected first type link may include the first type access point identifier (for example, a femtocell identifier). The information may be obtained in the S310.

The first type communication part 160-1 of the integrated access point 150 may report information about the connected first type link to the integrated layer processing part 172 (S312'). For example, the information about the connected first type link may include a first type terminal identifier of the multi-mode terminal 110 (for example, a cellular terminal identifier). The information may be obtained in the S310.

The integrated layer processing part 132 of the multi-mode terminal 110 may read the link setup information corresponding to the first type access point identifier from the memory (for example, 140 of FIG. 1) (S320), and provide the read information to the second type communication part 120-2 (S322). The steps S320 and S322 may correspond to a part of the S280 of FIG. 2. Although it is not illustrated in FIG. 3, the multi-mode terminal 110 may further perform operations corresponding to the steps S220, S240, and S250 explained in FIG. 2 before the step S320.

The integrated layer processing part 172 of the integrated access point 150 may read the link setup information corresponding to the first type terminal identifier from the memory (for example, 140 of FIG. 1) (S320'), and provide the read information to the second type communication part 160-2 (S322'). The integrated access point 150 may perform operations for generating, storing, querying, and utilizing the link setup information similarly to the operations of the multi-mode terminal (for example, the steps S250, S260, S270, and S280) illustrated in FIG. 2.

The multi-mode terminal 110 may perform a short setup procedure (including some or all of steps S340, S350-3, S350-2, S350-1, and S360 which will be described later) for connecting the second type link based on the provided link setup information (S330). Also, the integrated access point 150 may perform a short setup procedure (including some or all of steps S350-3', S350-2', S350-1', and S360 which will be described later) for connecting the second type link based on the provided link setup information (S330').

The multi-mode terminal 110 may perform efficient scanning or omit scanning based on the link setup information (S340).

In an example embodiment, the second type communication part 120-2 of the multi-mode terminal 110 may perform efficient scanning based on frequency channel information included in the link setup information. For example, when the second type access point is a WiFi AP, the link setup information may include information on a frequency channel in which the WiFi AP operates, and the second type communication part 120-2 may perform a passive scanning by tuning its receiver to the corresponding frequency channel (for example, reception of beacon frames from the WiFi AP).

In another example embodiment, the second type communication part 120-2 of the multi-mode terminal 110 may perform efficient scanning based on the second type access point identifier included in the link setup information. For example, when the second type access point is a WiFi AP, the link setup information may include a SSID of the WiFi AP, and the second type communication part 120-2 may perform an active scanning by using the SSID. That is, the SSID may be transmitted as included in a probe request message.

In other example embodiment, the second type communication part 120-2 of the multi-mode terminal 110 may determine that a counterpart access point is a second type access point which has a certain connection possibility based on the link setup information, omit the scanning procedure.

The multi-mode terminal 110 and the integrated access point 150 may perform an authentication procedure (S350 and S350').

In an example embodiment, the multi-mode terminal 110 and the integrated access point 150 may perform the whole authentication procedure (that is, the conventional authentication procedure) which perform all authentication steps determined according to a security mode for the second type communication (S350-3, S350'-3).

In another example embodiment, the multi-mode terminal 110 and the integrated access point 150 may perform a partial authentication procedure which performs a part of the conventional authentication procedure (S350-2 and S350'-2), or an omitted authentication procedure which omits all step of the conventional authentication procedure (S350-1 and S350'-1).

In an example embodiment, the information provided in the steps S322 and S322' may include authentication information for simplification or omission of authentication procedure. For example, the authentication information provided to the second type communication part 120-2 in the step S322 may include the second type access point identifier (e.g. the SSID of the WiFi AP) and a command instructing the second type access point having the corresponding second type access point identifier to perform authentication according to the corresponding authentication mode (e.g. the partial authentication procedure or the omission authentication procedure). The second type communication part 120-2 may perform authentication according to the corresponding authentication mode on the basis of necessary information such as authentication parameters, etc. which are obtained in advance by performing a previous conventional authentication procedure (e.g. stored in the step S270 of FIG. 2) and the information provided in the step S322. Also, for example, the authentication information provided to the second type communication part 160-2 in the step S322' may include the second type terminal identifier (e.g. the MAC address of the WiFi terminal) and a command instructing the second type terminal having the corresponding second type terminal identifier to perform authentication according to the corresponding authentication mode.). The second type communication part 160-2 may perform authentication according to the corresponding authentication mode on the basis of necessary information such as authentication parameters, etc. which are obtained in advance by performing a previous conventional authentication procedure and the information provided in the step S322.

For example, when an authentication procedure based on a WiFi Wired Equivalent Privacy (WEP) according to the security mode for the second type communication is used, and the integrated access point 150 already stores information mapping the first type terminal identifier of the multi-mode terminal 110 to the second type terminal identifier of the multi-mode terminal 110 in the memory (180 of FIG. 1) as the link setup information (e.g. like the step S270 of FIG. 2), the integrated access point 150 and the multi-mode terminal 110 may omit all of authentication steps (S350'-1). As another example, the integrated access point 150 and the multi-mode terminal 110 may perform communications with each other by using a shared key which is secured and stored by the previous conventional authentication procedure performed between them for a previous second type link setup.

As still another example, when a conventional authentication procedure according to a Temporal Key Integrity Protocol (TKIP) security mode is used, the integrated access point 150 and the multi-mode terminal 110 may perform the omission authentication procedure (S350-1 and S350'-1). If both sides require the same initialization procedure (e.g. a counter reset), they may perform the whole authentication procedure (S350-3 and S350'-3) or the partial authentication procedure (S350-2 and S350'-2).

On the other hand, the authentication mode may be predetermined between the multi-mode terminal 110 and the integrated access point 150. For example, it may be set initially when manufactured products are shipped, or may be negotiated and determined between them in the step S310.

The multi-mode terminal 110 and the integrated access point 150 may omit steps needed for association based on information provided through the steps S322 and S322'. In an example embodiment, the information provided through the steps S322 and S322' may include association information for omitting steps of the association procedure.

For example, the association information provided to the second type communication part 120-2 through the step S322 may include the second type access point identifier (e.g. the SSID of the WiFi AP) and a command instructing to configure the association state for the second type access point corresponding to the included second type access point identifier as associated state. The association information provided to the second type communication part 160-2 through the step S322' may include the second type terminal identifier (e.g. the MAC address of the WiFi terminal) and a command instructing to configure the association state for the second type terminal corresponding to the included second type terminal identifier as associated state.

Through the above-described procedure, the second type link setup is completed, and the second type communication between the multi-mode terminal 110 and the integrated access point 150 may be performed (S360).

Figure 4:
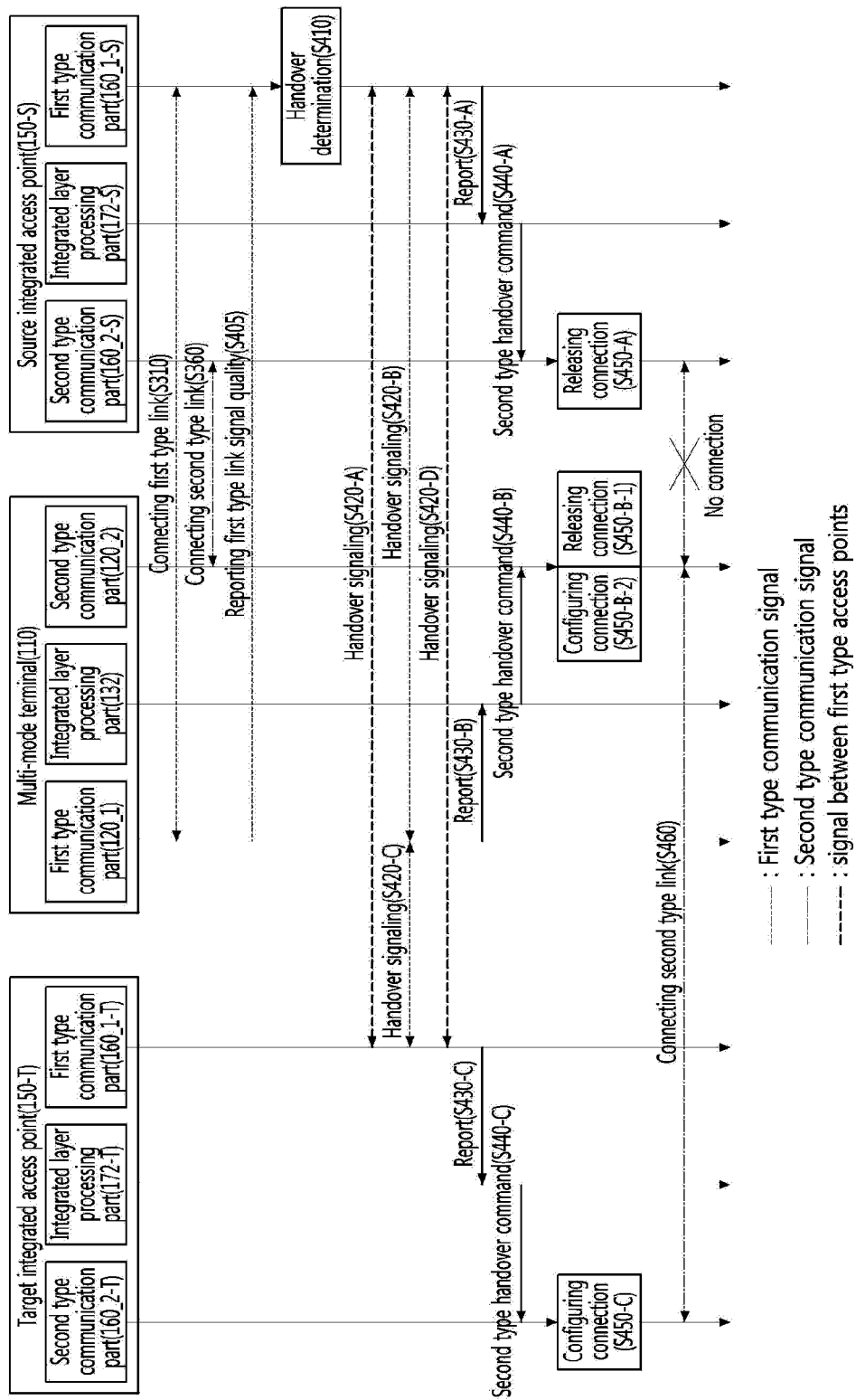
FIG. 4 illustrates a handover procedure according to example embodiments.

FIG. 4 illustrates a handover procedure according to example embodiments.

The example embodiments explained referring to FIG. 2 may be performed by the multi-mode terminal and the integrated access point supporting the first type communication and the second type communication.

In order help understanding, the example embodiments according to FIG. 4 may be explained as follows.

FIG. 4 is a sequence chart illustrating a situation in which the multi-mode terminal 110 is handed over from a source integrated access point 150-S to a target integrated access point 150-T when it performs the first type communication. This illustration represents an example embodiment in which a handover of the second type link is automatically performed when a handover of the first type link is performed.

First, both the first and second links may be connected between the multi-mode terminal 110 and the source integrated access point 150-S (S310 and S360). The method explained in FIG. 3 or other conventional methods may be used as a method for connecting the first and second type links.

While communications through the connected first type link are being performed between the multi-mode terminal 110 and the source integrated access point 150-S, a second type handover event may occur. In an example embodiment, it the multi-mode terminal 110 or the source integrated access point 150-S determines to perform the first type link handover, the second type link handover can be automatically determined to be performed. For example, referring to FIG. 4, the multi-mode terminal 110 may periodically report signal qualities of circumjacent first type links (e.g. signal strengths of circumjacent cells) to the source integrated access point 150-S (S405), and the source integrated access point 150-S may determine to perform the first type link handover and the second type link handover based on the reported information (S410).

If the first and second type link handovers are determined to be performed (S410), handover signaling (S420-A, S420-B, S420-C, and S420-D) may be performed. The handover signaling (S420-A) between the source integrated access point 150-S and the target integrated access point 150-T may include a singling that the source integrated access point 150-S notifies the target integrated access point 150-T of a handover decision of the corresponding terminal after the source integrated access point 150-S make the handover decision, and a signaling that the target integrated access point 150-T approves the handover decision. The handover signaling S420-B between the multi-mode terminal 110 and the source integrated access point 150-S may include a signaling that the source integrated access point 150-S instructs the multi-mode terminal 110 to perform a handover to the target integrated access point 150-T. The handover signaling S420-C between the multi-mode terminal 110 and the target integrated access point 150-T may include a signaling which is used for the multi-mode terminal 110 and the target integrated access point 150-T to set up the first type links to each other. The handover signaling S420-D between the source integrated access point 150-S and the target integrated access point 150-T may include a signaling used for the source integrated access point 150-S to forward traffic of the multi-mode terminal 110 which is received after the handover notification to the multi-mode terminal 110 to the target integrated access point 150-T.

Meanwhile, while the first type link handover is being performed (e.g. immediately after S420-A, S420-B, or S420-C) or after the first type handover is completed, each of first type communication parts 120-1, 160-1-S, and 5160-1-T may report information for starting the second type handover to each of integrated layer processing parts 132, 172-S, and 172-T (S430-A, S430-B, and S430-C). In an example embodiment, the first type communication part 160-1-S of the source integrated access point 150-S may report first type handover related information (e.g. information indicating that the first type link handover is determined to be performed, that the first type link handover is being performed, or that the first type link handover is completed) to the integrated layer processing part 172-S (S430-A). Then, the integrated layer processing part 172-S may provide the second type terminal identifier of the multi-mode terminal 110 to the first type communication part 120-1 so that the second type terminal identifier is transferred to the target integrated access point 150-T. In an example embodiment, the first type communication part 120-1 of the multi-mode terminal 110 may report the first type handover related information (e.g. information indicating that the first type link handover is determined to be performed, that the first type link handover is being performed, or that the first type link handover is completed) and the first type access point identifier of the target integrated access point 150-T to the integrated layer processing part 132 (S430-B). In an example embodiment, the first type communication part 160-1-T of the target integrated access point 150-T may report the first type handover related information (e.g. information indicating that the first type link handover is determined to be performed, that the first type link handover is being performed, or that the first type link handover is completed) and the second type terminal identifier of the multi-mode terminal 110 provided from the source integrated access point 150-S to the integrated layer processing part 172-T.

Each of the integrated layer processing parts 172-S, 132, and 172-T which receives each of the reports S430-A, S430-B, and S430-C may provide a command instructing to perform the second type link handover to each of the second type communication part 160-2-S, 120-2, and 160-2-T (S440-A, S440-B, and S440-C). In response to this, each of the second type communication parts 160-2-S, 120-2, and 160-2-T may perform the second type handover (S450-A, S450-B, and S450-C).

In an example embodiment, the integrated layer processing part 172-S of the source integrated access point 150-S may provide the second type communication part 160-2-S with a command instructing to perform a simple deassociation procedure on the second type communication part 120-2 of the multi-mode terminal 110 (S440-A). In response to this, the second type communication part 160-2-S may perform the deassociation without signal exchanges for deassociation.

In an example embodiment for a deassociation procedure, the integrated layer processing part 132 of the multi-mode terminal 110 may provide the second type communication part 120-2 with a command instructing to perform a simple deassociation procedure on the second type communication part 160-2-S of the source integrated access point (150-S) (S440-B). In response to this, the second type communication part 160-2-S may perform the deassociation without signal exchanges for deassociation (S450-B-1). In an example embodiment for connecting the second type link, the integrated layer processing part 132 of the multi-mode terminal 110 may check whether link setup information corresponding to the first type access point identifier of the target integrated access point 150-T obtained through the S430-B exist in the memory (e.g. 140 of FIG. 1), provide the second type communication part 120-2 with the link setup information and a command instructing to perform a shortened setup procedure when the link setup information exists in the memory (S440-B), and provide a command instructing to perform a conventional setup procedure when the link setup information does not exist in the memory (S440-B). In response to this, the second type communication part 120-2 of the target integrated access point 150-T may perform a corresponding setup procedure (the shortened setup procedure or the conventional setup procedure) for connecting a link to the second type access point of the target integrated access point 150-T (S405-B-2). As the shortened setup procedure or the conventional setup procedure, the above-described methods referring to FIGS. 2 and 3 may be used.

In an example embodiment, the integrated layer processing part 172-T of the target integrated access point 150-T may check whether link setup information corresponding to the first type terminal identifier of the multi-mode terminal 110 obtained through the S430-C exist in the memory (e.g. 180 of FIG. 1), provide the second type communication part 160-2-T with the link setup information and a command instructing to perform a shortened setup procedure when the link setup information exists in the memory (S440-C), and provide a command instructing to perform a conventional setup procedure when the link setup information does not exist in the memory (S440-C). In response to this, the second type communication part 160-2-T may perform a corresponding setup procedure (the shortened setup procedure or the conventional setup procedure) for connecting a link to the second type communication part 120-2 of the multi-mode terminal 110 (S405-C). As the shortened setup procedure or the conventional setup procedure, the above-described methods referring to FIGS. 2 and 3 may be used.

Meanwhile, FIG. 4 illustrates an example embodiment in which the connection setup (S450-B-2 and S450-C) and the connection release (S450-B-1 and S450-A) are performed simultaneously. However, example embodiments in which the connection setup and connection release may be started and/or completed independently at different times.

Through the above-described procedure, the second type link is connected (S460), and the second type handover is completed in addition to the first type handover.

Figure 5:
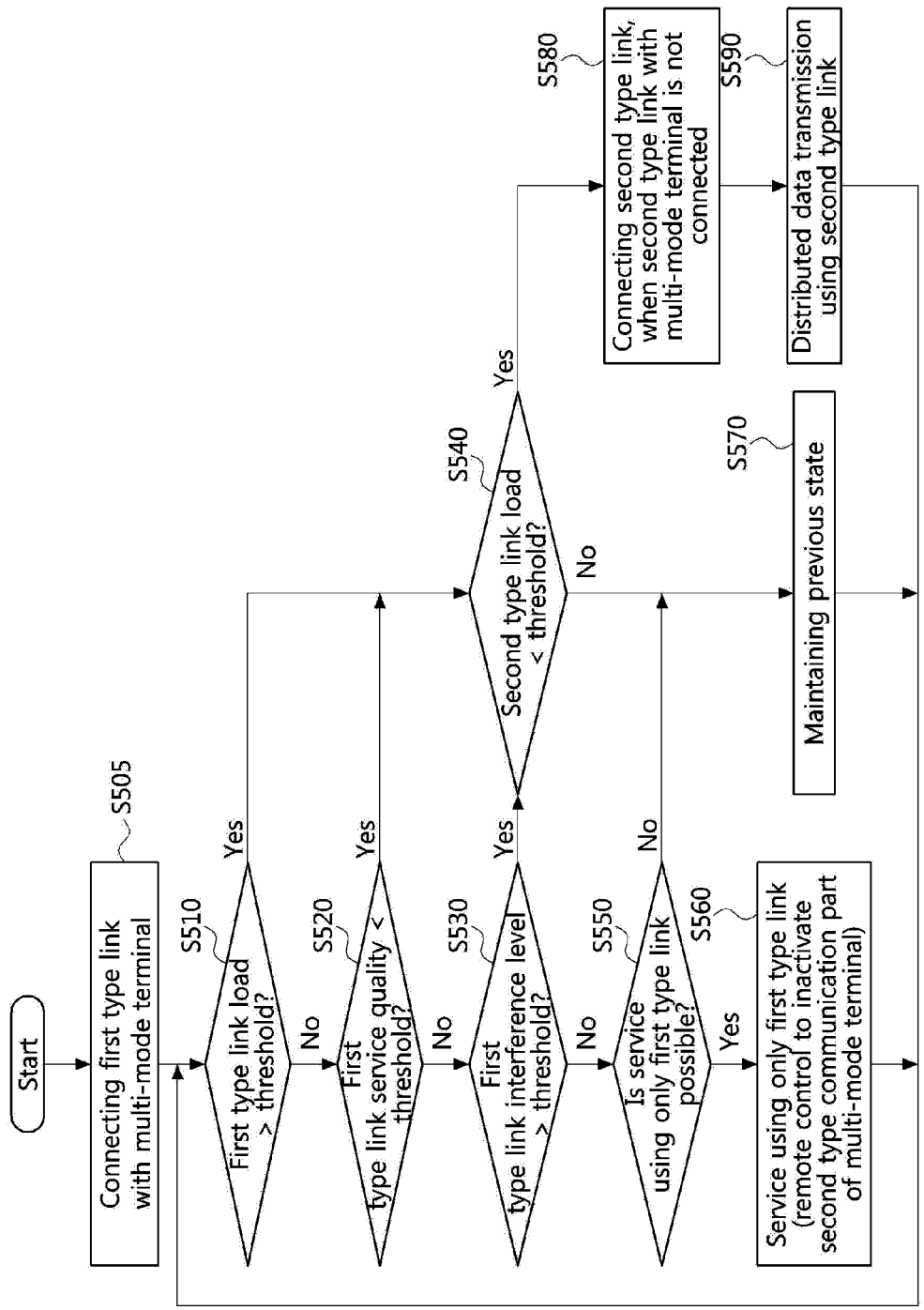
FIG. 5 is a flow chart illustrating methods for data distribution among links according to example embodiments of the present invention.

FIG. 5 is a flow chart illustrating methods for data distribution among links according to example embodiments of the present invention.

The example embodiments illustrated in FIG. 5 may be performed by the multi-mode terminal and the integrated access point supporting the first type communication and the second type communication when they are communicating with each other.

First, the integrated access point and the multi-mode terminal connect the first type link (S505).

The integrated access point determines whether load of the first type link is heavy (for example, whether load of the first type link is greater than a preconfigured threshold value) (S501). For example, the integrated layer processing part of the integrated access point may be provided with information on the load from the first type communication part, and perform the determination. As examples of the load information of the first type link, amount of data in a downlink buffer or a uplink buffer, usage degree of radio resources (frequency, time slots, transmission power, etc.), etc. may be used.

If the load of the first type link is greater than the preconfigured threshold value (S510), the S540 is performed. Otherwise, the step S520 is performed.

In the step S520, the integrated access point determines whether a current service quality of the first type link is poor or not (for example, whether it is lower than a preconfigured threshold value). For example, the integrated layer processing part of the integrated access point may be provided with information on the service quality from the first type communication part, and perform the determination. The quality information of the first type link may include transmission throughput, transmission latency, frame error rate, signal to noise ratio (SNR), etc.

If the service quality of the first type link is lower than the preconfigured threshold value (S520), the step S540 is performed. Otherwise, the step S530 is performed.

In the step S530, the integrated access point determines whether interference level of the first type link is severe (for example, whether it is greater than a preconfigured threshold value). For example, the integrated layer processing part of the integrated access point may be provided with information on the interference level from the first type communication part, and perform the determination. The interference level information of the first type link may include strength of uplink interference signal received at the integrated access point or strength of downlink interference signal received at the multi-mode terminal. A case when uplink interference signal strength is high may mean that a terminal belonging to other cell exists on the periphery. Meanwhile, a case when the downlink interference signal strength is high may mean that a base station of other cell giving the high downlink interference exists on the periphery.

If the interference level of the first type link is higher than the preconfigured threshold value (S530), the step S540 is performed. Otherwise, the step S550 is performed.

In the step S540, the integrated access point determines whether load of the second type link is low (for example, whether load of the second type link is lower than a preconfigured threshold value). For example, the integrated layer processing part of the integrated access point may be provided with information on the load from the second type communication part, and perform the determination. As examples of the load information of the second type link, amount of data in a downlink buffer or a uplink buffer, usage degree of radio resources (frequency, time slots, transmission power, etc.), etc. may be used.

If the load of the second type link is lower than the preconfigured threshold value (S540), the S580 is performed. Otherwise, the step S570 is performed.

In the step S550, the integrated access point determines whether traffic of the multi-mode terminal can be served by using only the first type link with satisfying a predetermined service quality level. For example, the integrated layer processing part of the integrated access point may be provided with the load information from the first type communication part, and perform the determination.

If the service is not possible (S550), the step S570 is performed. Otherwise, all the traffic may be served by only the first type communication part (S560). In an example embodiment, the integrated access point may perform a remote control for inactivating the second type communication part of the multi-mode terminal, whereby power consumption of the multi-mode terminal may be reduced.

In the step S570, the integrated access point maintains a previous state. For example, in the integrated access point, data transmission service may be performed by using only the first type link, or by both the first type link and the second type link (that is, a distributed data transmission service).

In the step S580, if the second type link is not connected to the multi-mode terminal, the integrated access point connects the second type link. For example, when the second type communication part of the multi-mode terminal is in inactivated state, the integrated access point may perform a remote control for activating the multi-mode terminal, and then connect the second type link. As a method for connecting the second type link, a method according to the present invention or other method may be used. Then, the integrated access point transmits data through the second type link dispersively (that is, downlink transmission) (S590).

According to the example embodiments of the present invention, a part of traffic being transmitted through the first type link can be dispersively transmitted through the second type link, whereby the status (for example, load, interference, and/or quality) of the first type link can be enhanced.

Figure 6:
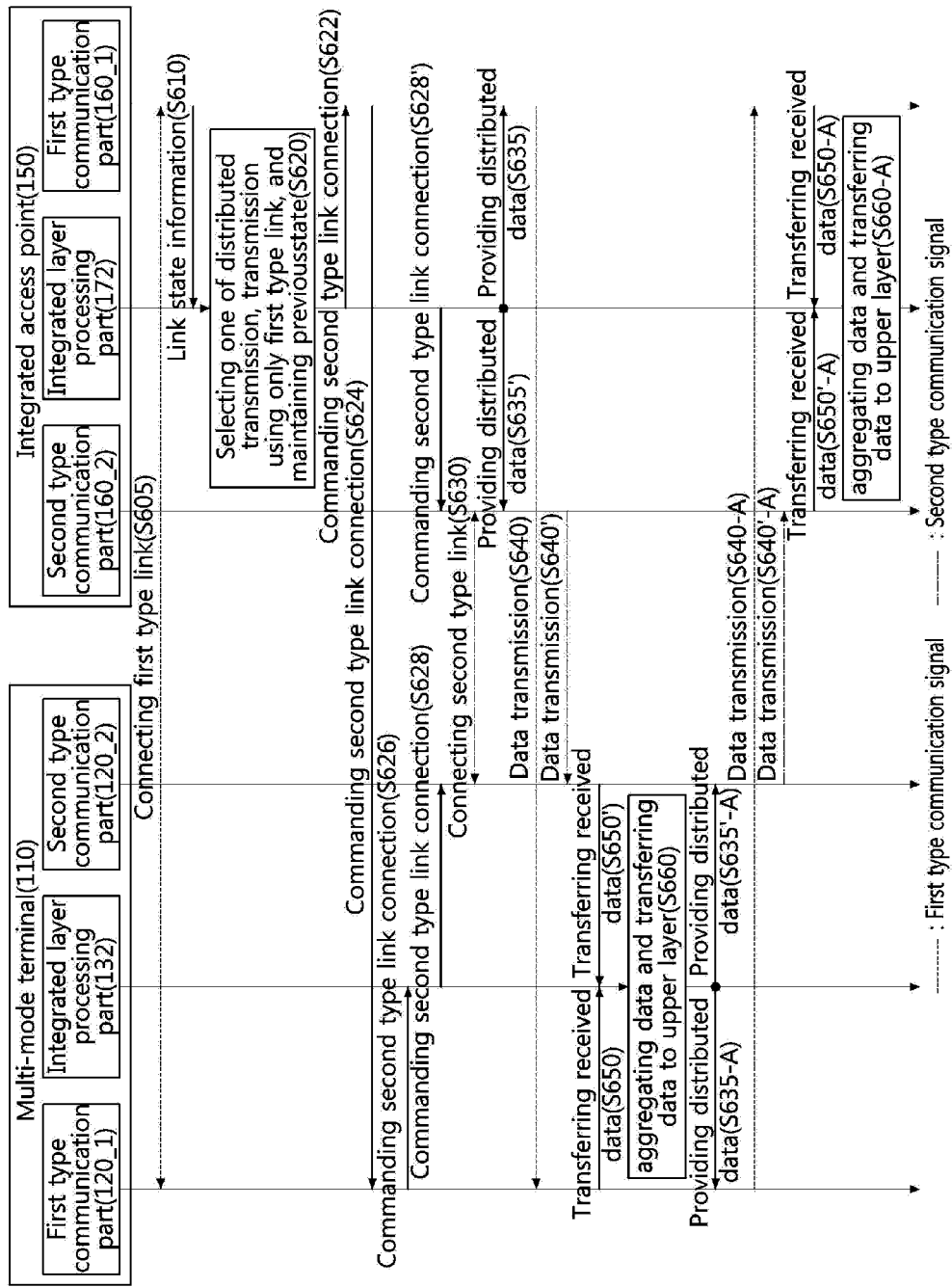
FIG. 6 illustrates a procedure for data distribution according to example embodiments of the present invention.

FIG. 6 illustrates a procedure for data distribution according to example embodiments of the present invention.

The example embodiments illustrated in FIG. 6 may be performed by the multi-mode terminal and the integrated access point supporting the first type communication and the second type communication.

In order to help the understanding, the example embodiments according to FIG. 6 may be explained referring to FIG. 1 and FIG. 5.

Specifically, FIG. 6 illustrates detail operation of the step S590 and detail operations until the step S590.

First, the first type link between the integrated access point 150 and the multi-mode terminal 110 is connected (S605).

The integrated layer processing part 172 of the integrated access point 150 may be provided with link state information (that is, load, quality, and/or interference) of the first type link from the first type communication part 160-1 (S610), and determine whether to perform distributed data transmission (S620). For example, the integrated layer processing part 172 may determine to perform one of distributed transmission using the second type link, inactivating the second type communication part 120-2, and maintaining a previous state. Here, the distributed transmission using the second type link, the inactivating the second type communication part 120-2, and the maintaining a previous state may respectively correspond to the steps S590, S560, and S570 of FIG. 5.

It is determined to perform the distributed transmission using the second type link, the integrated layer processing part 172 may provide the first type communication part 160-1 with a command instructing to connect the second type link (in addition, if necessary, a command instructing to activate the second type communication part of the multi-mode terminal) (S622), whereby the command is transferred to the multi-mode terminal through the first type link (S624). The command for connecting the second type link is transferred to the integrated layer processing part 132 (S626). In response to this, the integrated layer processing part 132 controls the second type communication 120-2, thereby connecting the second type link. Meanwhile, in order to connect the second type link, the integrated layer processing part 32 may activate the second type communication part 120-2 if necessary.

Similarly, the integrated layer processing part 172 of the integrated access point 150 may provide the second type communication part 160-2 with a command instructing to connect the second type link to the multi-mode terminal (S628').

After the completion of the steps S628 and S628', the second type link may be connected (S630).

If the second type link is connected (S630), the integrated layer processing part 150 may perform distributed data provision and related controls for the first type communication part 160-1 and the second type communication part 160-2, whereby traffic being transmitted through only the first type link may also be transmitted through the second type link dispersively (S635, S635').

After the steps S635 and S635', data is dispersively transmitted through both the first type link and the second type link (S640, S640'), and the first and second type communication parts 120-1 and 120-2 of the multi-mode terminal which receive the data may notify the receipt of the data or provide the received data to the integrated layer processing part 132 (S650, S650').

The integrated layer processing part 132 aggregates the received data, and transfers the aggregated data to an upper layer (S660). Here, the integrated layer processing part 132 may perform reordering on the data which are respectively received from the first and second communication part 120- and 120-2 according to their sequence numbers, and transfer the data to the upper layer. For example, the integrated layer processing part 132 may store a predetermined amount (e.g. the predetermined number of bytes or packets) of received data as they are reordered according to their sequence numbers, and transfer the reordered data to the upper layer. Alternatively, the integrated layer processing part 132 may the stored data to the upper layer without the reordering, when the amount of stored data exceeds a preconfigured amount or the received data is stored longer than a certain period of time. Also, a distributed uplink transmission may be performed on the data transmitted by the multi-mode terminal 110 through steps S635-A, S635'-A, S640-A, S640'-A, S650-A, S650'-A, and S660-A, similarly to the above-described steps S635, S635' S640, S640' S650, S650', and S660.

Figure 7:
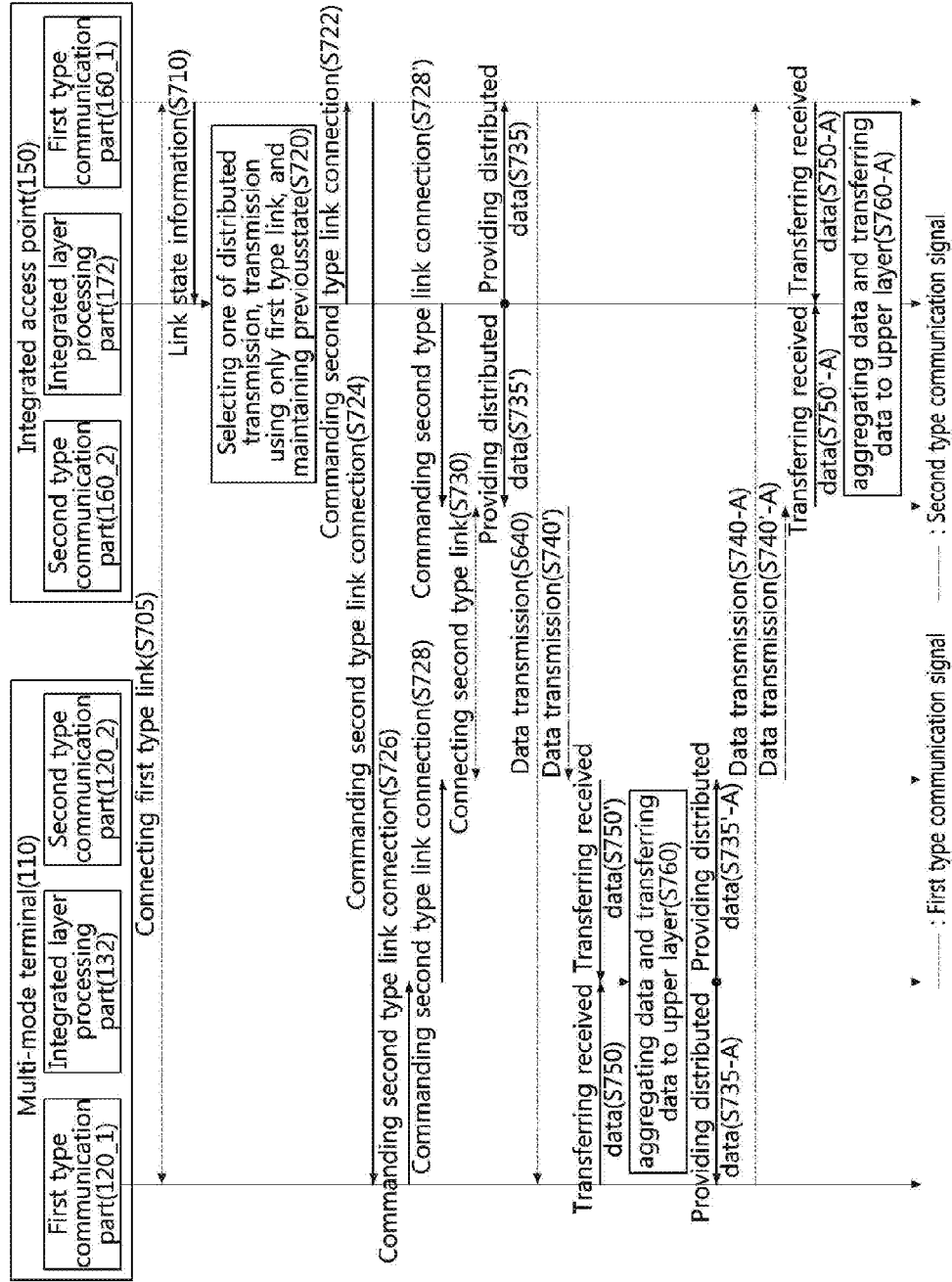
FIG. 7 illustrates a procedure for data distribution according to example embodiments of the present invention.

FIG. 7 illustrates a procedure for data distribution according to example embodiments of the present invention.

The example embodiments illustrated in FIG. 7 may be performed by the multi-mode terminal and the integrated access point supporting the first type communication and the second type communication.

In order to help the understanding, the example embodiments according to FIG. 7 may be explained referring to FIG. 1 and FIG. 5.

Specifically, FIG. 7 illustrates detail operation of the step S560 and detail operations until the step S560.

The steps S705, S710, and S720 may be performed similarly to the steps S605, S610, and S620 of FIG. 2.

If the second type communication part 120-2 is determined to be inactivated in the step S720, the integrated layer processing part 172 may provide the first type communication part 160-1 with a inactivation command for the second type communication part 120-2 (S722), thereby transferring the command to the multi-mode terminal 110 through the first type link (S724). The received inactivation command is transferred to the integrated layer processing part 132 (S726). In response to this, the integrated layer processing part 132 performs controls to inactivate the second type communication part 120-2 (S728).

Similarly, the integrated layer processing part 172 of the integrated access point 150 may perform controls to inactivate the second type communication part 160-2 and release the second type link (S728'). After then, in case the previously-connected second type link exists, the connection of the corresponding link may be released (S730).

The integrated access point 150 may provide data to the first type communication part 160-1 for downlink data transmission through the first type link (S735). The data may be transferred to the first type communication part 120-1 of the multi-mode terminal 110 through the first type link (S740). The first type communication part 120-1 provides the received data to the integrated layer processing part 132 (S750), and the integrated layer processing part 132 transfers the provided data to the upper layer (S760).

Also, uplink transmission procedures using the first type link may be performed on the data to be transmitted from the multi-mode terminal 110 by steps S735-A, S740-A, S750-A, and S760-A, similarly to the above-described downlink transmission procedures comprising S735, S740, S750, and S760.

Figure 8:
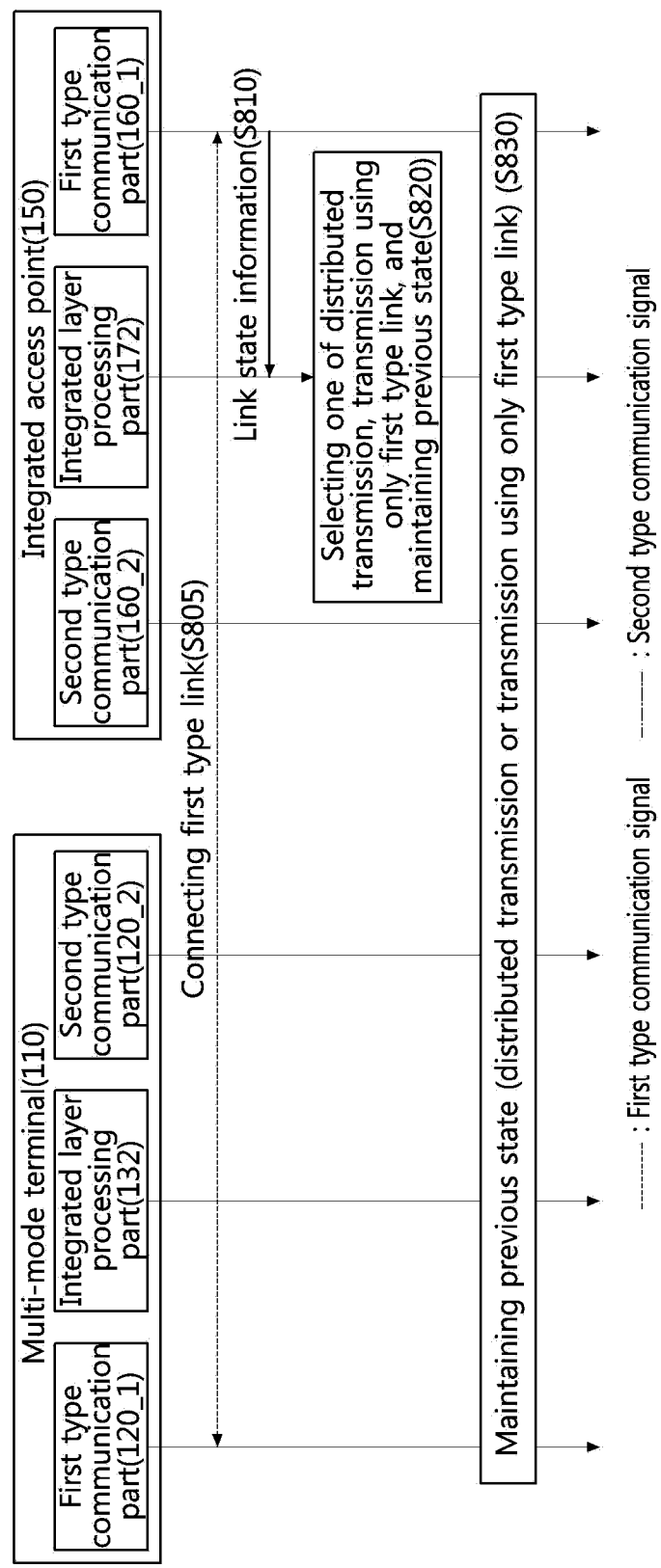
FIG. 8 illustrates a procedure for data distribution according to example embodiments of the present invention.

FIG. 8 illustrates a procedure for data distribution according to example embodiments of the present invention.

The example embodiments illustrated in FIG. 8 may be performed by the multi-mode terminal and the integrated access point supporting the first type communication and the second type communication.

In order to help the understanding, the example embodiments according to FIG. 8 may be explained referring to FIG. 1 and FIG. 5.

Specifically, FIG. 8 illustrates detail operation of the step S570 and detail operations until the step S570.

The steps S805, S810, and S820 may be performed similarly to the above-described steps S605, S610, and S620.

If the previous state is determined to be maintained in the step S820, the previous state may be maintained (S830). For example, in case that the previous state is a state in which the distributed data transmission is being performed, the downlink distributed data transmission procedures (S635, S635', S640, S640', S650, S650', and S660) which are illustrated in FIG. 6 may be performed. Also, as another example, in case that the previous state is a state in which data transmission using only the first type link is being performed, the downlink transmission procedures (S735, S740, S750, and S760) using the only first type link, which are illustrated in FIG. 7, may be performed. The similar explanation on the previous states related to uplink transmission may be possible.

Figure 9:
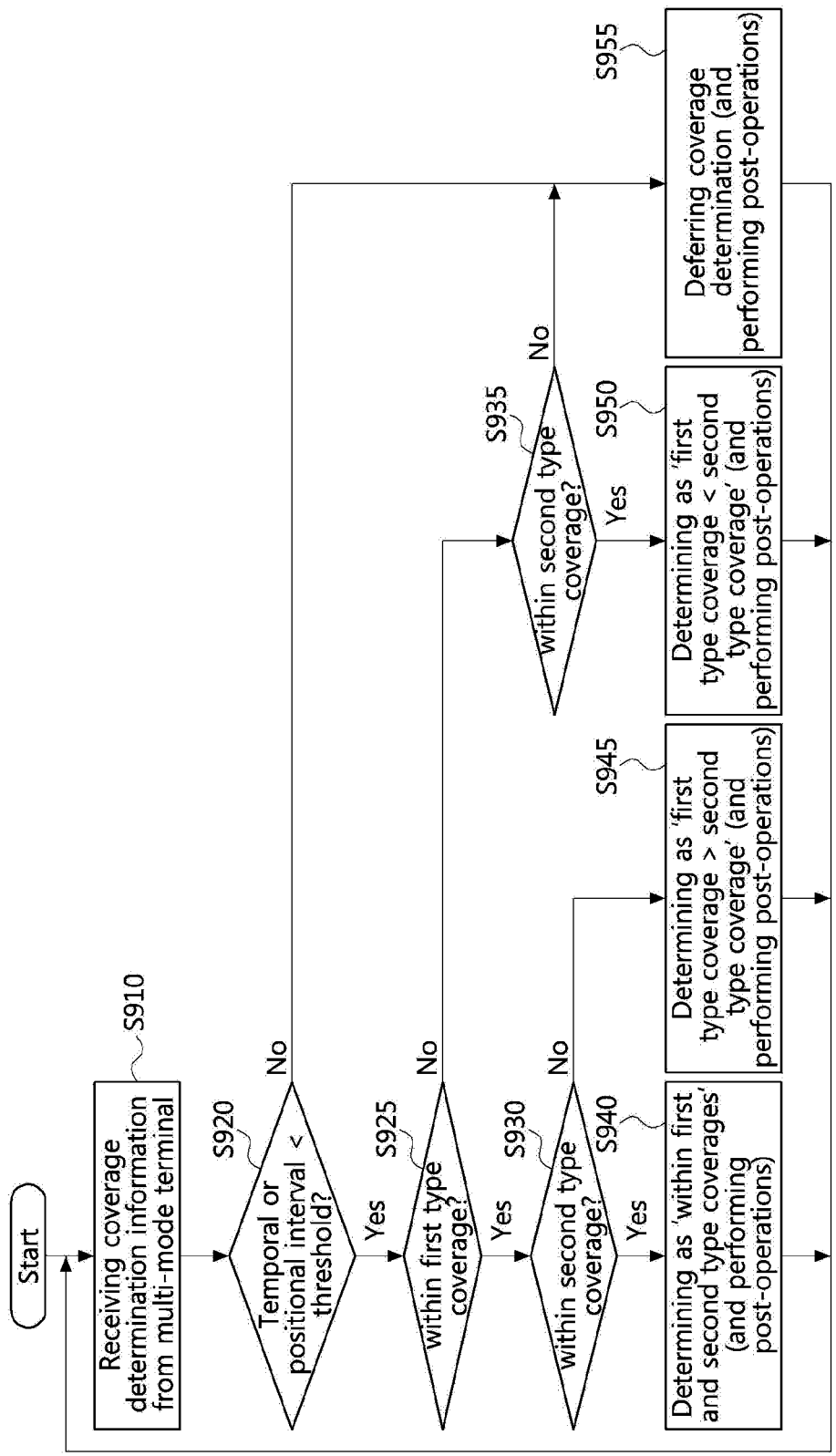
FIG. 9 is a flow chart illustrating a method of coverage matching for each link according to example embodiments of the present invention.

FIG. 9 is a flow chart illustrating a method of coverage matching for each link according to example embodiments of the present invention.

The example embodiments illustrated in FIG. 8 may be performed by a multi-mode terminal and an integrated access point supporting a first type communication and a second type communication when they are communicating with each other.

First, the integrated access point is reported from the multi-mode terminal information (hereinafter, referred to as 'coverage determination information') for determining a coverage of the first type communication (hereinafter, referred to as a 'first type coverage') and a coverage of the second type communication (hereinafter, referred to as a 'second type coverage') (S910). The coverage determination information is information which the multi-mode terminal obtains by receiving and measuring signals received from the first and second type access points of the integrated access point, and may be used by the integrated access point for generating a coverage map describing the first type coverage and the second type coverage. For example, if the integrated access point is an integrated femtocell base station, the integrated access point may generate the coverage map for the corresponding LTE cell and the WiFi AP based on the coverage determination information. The coverage determination information may include, for example, received signal strength, signal to noise ratio (SNR) of received signal, path loss, etc.

The multi-mode terminal may report the coverage determination information for the first type coverage and the coverage determination information for the second type coverage to the integrated access point by using separate messages. Alternatively, the multi-mode terminal may report the coverage determination information for the first type coverage and the coverage determination information for the second type coverage to the integrated access point by using a single integrated message.

If the coverage determination information for each link is reported by using a separate message, the integrated access point determines whether a time interval between two reports or a distance between two reporting positions of the multi-mode terminal is smaller than a preconfigured threshold value (S920). For example, the determination may be performed by the integrated layer processing part of the integrated access point.

If the interval or the distance is not smaller than the preconfigured threshold value (S920), the integrated layer processing part determines that the two reports are based on measurements performed at different positions, and then the step S955 is performed. Otherwise, the step S925 is performed.

In the step S955, the integrated layer processing part defers the determination on mutual relation of coverages. For example, the integrated layer processing part may not perform link coverage matching. The most recently received report may be stored in a database, thereby being used for a later determination on whether to perform coverage matching. That is, a time interval between the stored report and the later received report or a distance between reporting positions of the two reports is used for the later determination.

If reported strength of the first type communication signal is higher than a preconfigured threshold value (S925), the integrated layer processing part determines that the multi-mode terminal is located within the first type coverage, and then the step S930 may be performed. Otherwise, the step S935 may be performed.

In the step S930 or S935, the integrated layer processing part may determine whether the second type coverage is larger than a preconfigured threshold value. Then, the integrated layer processing part may perform a final coverage determination (S940, S945, or S950) or defer the determination (S955).

The step S940 may be selected when the integrated access point determines that the multi-mode terminal is located within the first and second type coverages. As an example of post-operation after the step S940, since the integrated layer processing part did not identify mutual relation between two coverages, the integrated layer processing part tries coverage matching continuously based on reports received later from the multi-mode terminal.

The step S945 may be selected when the integrated access point determines that the multi-mode terminal is located within the first type coverage, and is out of the second type coverage. As an example of post-operation after the step S945, there may be two options.

The first option is monitoring whether the second type coverage becomes larger than a preconfigured threshold, and triggering automatic connection of the second type link only when the second type coverage becomes larger than the preconfigured threshold. Another option is increasing the second type communication signal strength by a predetermined amount in order to increase the second type coverage. For the latter case, the integrated access point may continuously monitor changes of the coverages by referring to reports received later from the multi-mode terminal, and try the coverage matching.

The step S950 may be selected when the integrated access point determines that the multi-mode terminal is located within the second type coverage, and is out of the first type coverage. As an example of post-operation after the step S950, there may be three options—triggering automatic connection of the second type link, increasing the first type signal strength by a predetermined amount in order to increase the first type coverage, and decreasing the second type communication signal strength by a predetermined amount in order to decrease the second type coverage. For the latter case, the integrated access point may continuously monitor changes of the coverages by referring to reports received later from the multi-mode terminal, and try the coverage matching.

The step S955 may be selected when the coverage determination information which cannot be properly used for identifying mutual relation between the coverages is received (e.g. a case when the procedure is branched to S920). For example, when the coverage determination information having improper temporal or positional gap is received, the step S955 may be selected. Also, the step S955 may be selected when the integrated access point does not identify mutual relation between the two coverages (e.g. a case when the procedure is branched to S935). As an example of post-operation after the step S955, the integrated access point does not perform link coverage matching, and wait for the next reporting.

Figure 10:
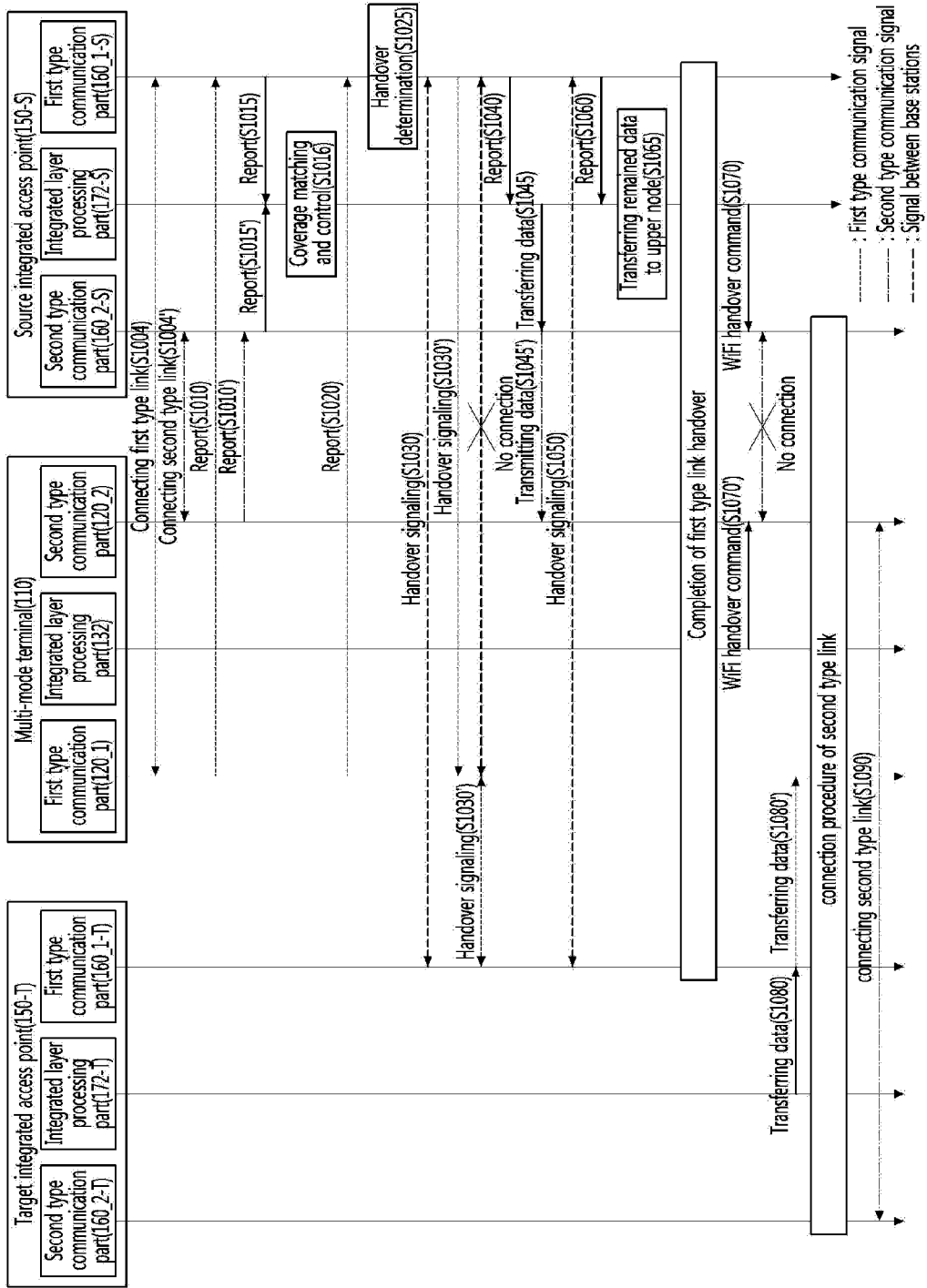
FIG. 10 illustrates a procedure of coverage matching for each link according to example embodiments of the present invention.

FIG. 10 illustrates a procedure of coverage matching for each link according to example embodiments of the present invention.

The example embodiments illustrated in FIG. 10 may be performed by a multi-mode terminal and an integrated access point supporting a first type communication and a second type communication.

In order to help the understanding, the example embodiments according to FIG. 10 may be explained referring to FIG. 1 and FIG. 9.

Specifically, FIG. 10 illustrates operations until the step S950 of FIG. 9 and a seamless transmitting operation based on coverage matching in LTE handover as an example of application of the step S950.

First, the multi-mode terminal 110 and the source integrated access point 150-S perform connection of the first type link and connection of the second type link (S1004, S1004'). Here, the connection methods according to the present invention, which are explained through FIG. 3, etc., and other methods may be used for performing the connections.

The multi-mode terminal 110 reports the coverage determination information for the first type and second type links to the source integrated access point 150-S (S1010, S1010').

Then, each of the first type communication part 160-1-S and the second type communication part 160-2-S transfers the received report to the integrated layer processing part 172-S (S1015, S1015'). The integrated layer processing part 172-S may identify mutual relation between the first type and second type coverages based on the transferred reports, and control each of the coverages (S1016). In the example embodiment according to FIG. 10, in the step S1016, it is assumed that the second type coverage is larger than the first type coverage similarly to the step S950 of FIG. 9. Thus, the steps S1045, S1045', etc. may be performed.

Meanwhile, the multi-mode terminal 110 may transmit a report for determining handover on the first type link to the source integrated access point 150-S (S1020). The source integrated access point 150-S may determine the handover based on the report (S1025). Then, the source integrated access point 150-S and the target integrated access point 150-T may notify and approve the handover of the multi-mode terminal 110 via a handover signaling (S1030). Then, the first type communication part 160-1-S of the source integrated access point 150-S transmits a handover command instructing to perform the handover to the multi-mode terminal 110 (S1030'), and stops data transmission to the multi-mode terminal 110 through the first type communication part 160-1-S. On the receipt of the handover command, the multi-mode terminal 110 may try to connect a link to the target integrated access point 150-T (S1030'). At the same time, the first type communication part 160-1-5 of the source integrated access point 150-S notifies the handover of the multi-mode terminal to the integrated layer processing part 172-S (S1040), and the integrated layer processing part 172-S controls the second type communication part 160-2-S, thereby performing later data transmission through the only second type communication part 160-2-S (S1045, S1045').

If an upper data transmission path is configured toward the target integrated access point 150-T by the rest of handover signaling (S1050), the integrated layer processing part 172-S of the source integrated access point 150-S transfers remaining data to an upper network node in place of the multi-mode terminal 110, whereby the remained data is transferred to the target integrated access point 150-1 (S1065). Through the procedures until this, the first type communication handover of the multi-mode terminal is completed. Then, the integrated layer processing part 172-S of the source integrated access point 150-S and the integrated layer processing part 132 of the multi-mode terminal 110 commands handover of the second type link, and release the second type link connection (S1070, S1070'). At this time, since the first type link is already established, the target integrated access point 150-T and the multi-mode terminal 110 may exchange their data through the first type link (S1080, S1080'). Then, after the connection of the second type link is completed, data can be transmitted and received also through the second type link (S1090).

Figure 11:
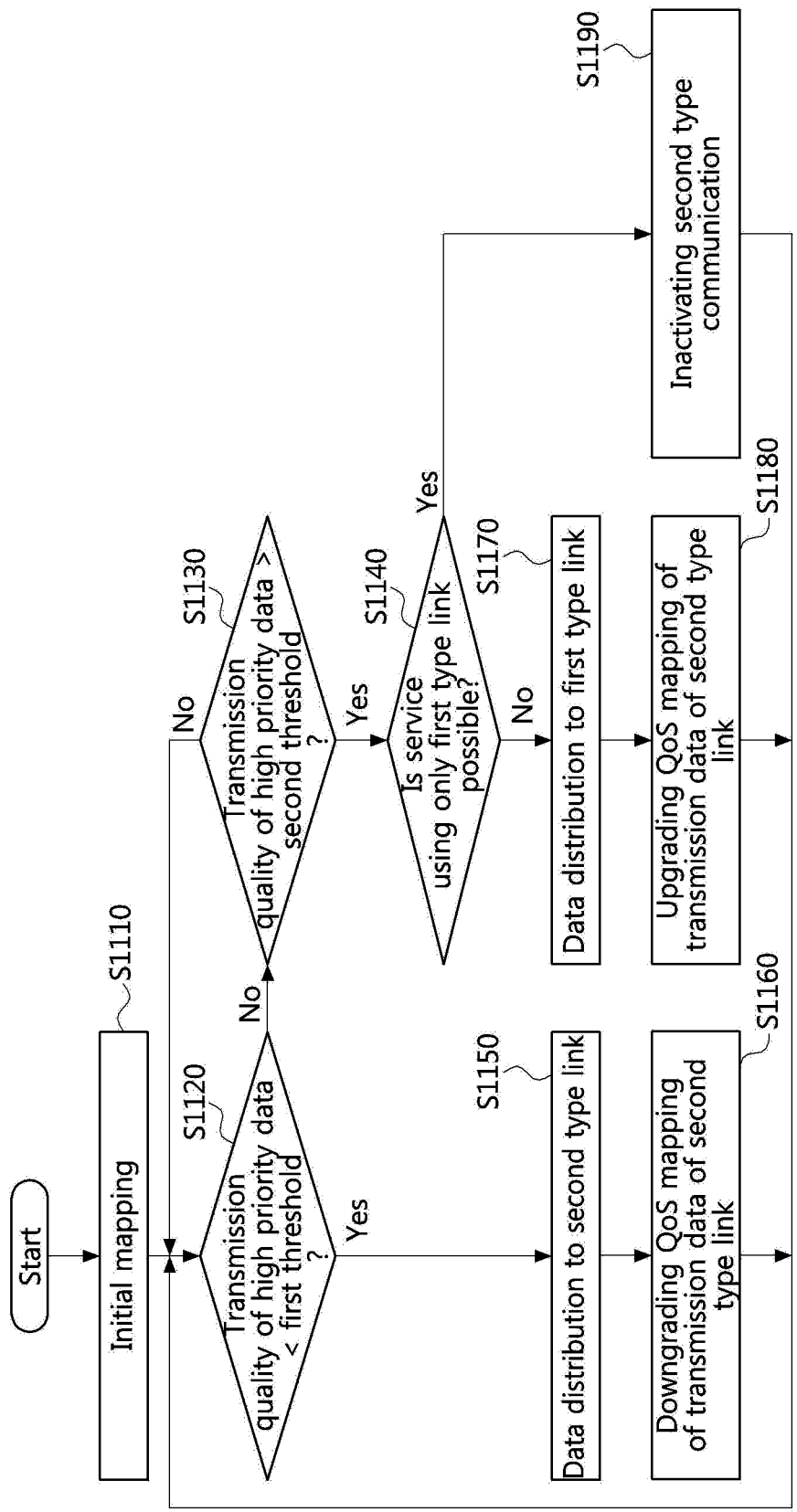
FIG. 11 is a flow chart illustrating a method for transmitting video data according to example embodiments.

FIG. 11 is a flow chart illustrating a method for transmitting video data according to example embodiments.

The example embodiments illustrated in FIG. 11 may be performed by a multi-mode terminal and an integrated access point supporting a first type communication and a second type communication when they are communicating with each other.

In an example embodiment, the integrated access point may transmit data having a higher priority (hereinafter, referred to as 'high priority data') through the first type link, and transmit data having a lower priority (hereinafter, referred to as low priority data') through the second type link. Here, although the first type link (e.g. a cellular communication link) provides a stable service, it may have a low transmission throughput or a low transmission rate as compared to its cost. On the contrary, the second type link (e.g. a WiFi communication link) may be a communication link having the opposite properties.

In other example embodiment, the integrated access point may transmit the high priority data through both the first and second type links, and transmit the low priority data through only the second type link.

Here, for example, in case of video data, higher priorities are assigned to a frame of video data in the order of an intra-coded frame (I), a predictive-coded frame (P), and a bidirectional-code frame (B). Also, in case of scalable vide data, higher priorities are assigned to video data in the order of base layer data and enhanced layer data.

In still other example embodiment, as shown in FIG. 11, the integrated access point may transmit data dispersively through the first type link and the second type link. Also, distribution of the data may be controlled according to a current service quality of the high priority data, or the QoS mapping of data transmitted through the second type link may be controlled according to the current service quality of the high priority data.

In FIG. 11, the present example embodiment will be explained on the assumption that the first type communication is a cellular communication and the second type communication is a WiFi communication.

Referring to FIG. 11, the integrated access point may initiate transmission with initial values on whether data is transmitted through the first type link or the second type link according to priority of the data and on which QoS class (e.g. AC of WiFi communication) the data is mapped onto (S1110). While performing the data transmission, if a service quality of the high priority data is lower than a first threshold value (S1120), the integrated access point determines that load of the first type link is high, and transmits some of low priority data being transmitted through the first type link through the second type link in order to reduce the load of the first type link (S1150). Since load of the second type link may be increased due to the above procedure, the integrated layer processing part may map some of data being transmitted through the second type link onto the lower QoS classes (S1160). Through this, a higher priority data among the data being transmitted through the second type link can be transmitted with a better service quality.

Meanwhile, if the service quality for the high priority data is higher than a second threshold value (a higher value than the first threshold value) (S1130), the integrated access point may determine that the load of the first type is sufficiently low, and transmits some of low priority data or all data being transmitted through the second type link through the first type link. For this, the integrated access point determines whether all data being transmitted through the second type link can be transmitted through the first type link (S1140). If the load becomes lower to such an extent that all the data of the second type link can be transmitted through the first type link, the second type communication part may be inactivated, and all the data may be transmitted through the first type link (S1190). Otherwise, only some of low priority data being transmitted through the second type link may be transmitted through the first type link (that is, moved to the first type link) (S1170). The step S1170 can reduce the load of the second type link, and accordingly the integrated access point may map data to be transmitted through the second type link onto a higher QoS class (S1180). Therefore, the data being transmitted through the second type link can be transmitted with a higher service quality as compared to the lower priority data.

Figure 12:
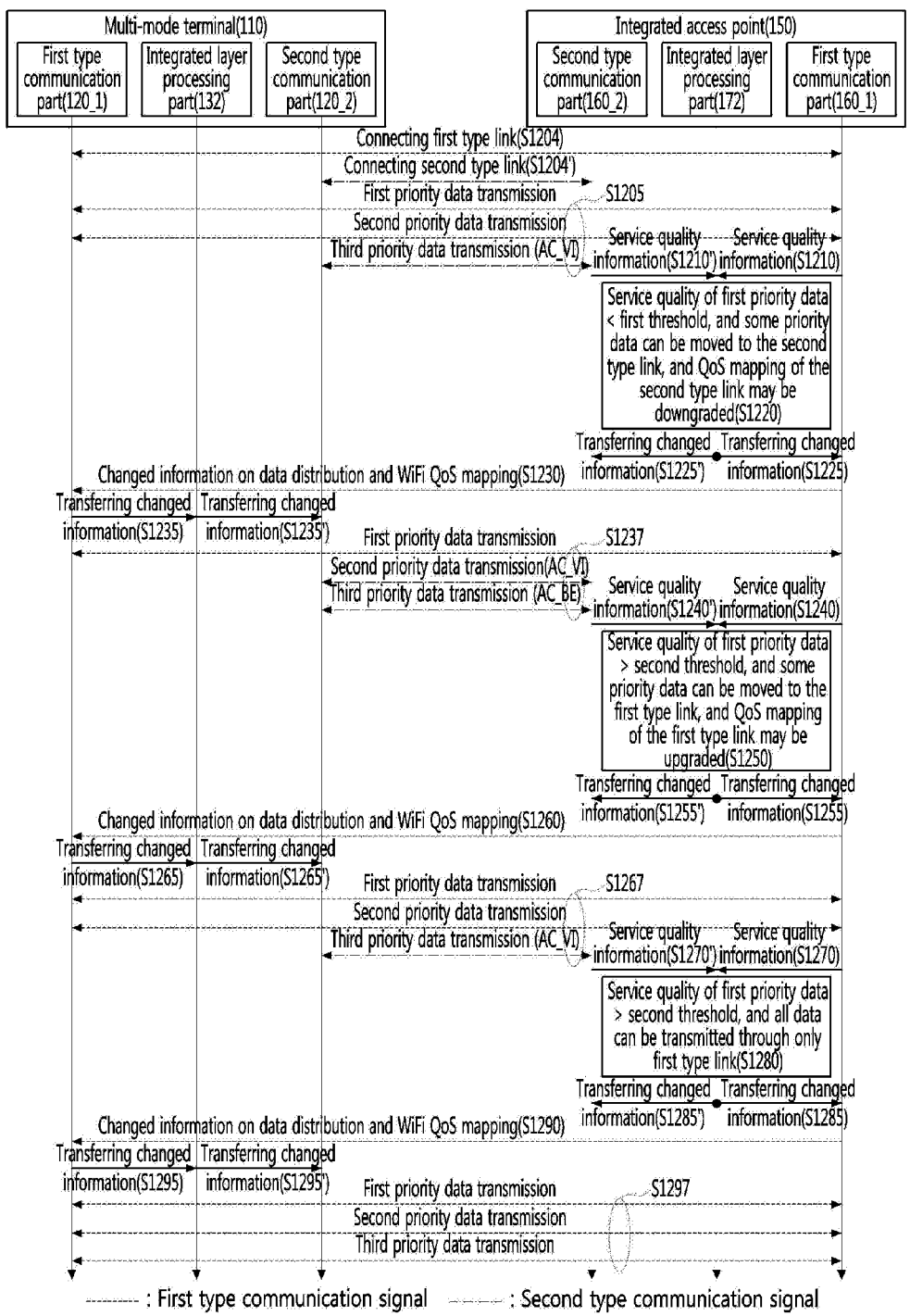
FIG. 12 illustrates an example of mapping control and distributed data transmission according to example embodiments of the present invention.

FIG. 12 illustrates an example of mapping control and distributed data transmission according to example embodiments of the present invention.

The example embodiments illustrated in FIG. 12 may be performed by a multi-mode terminal and an integrated access point supporting a first type communication and a second type communication.

In order to help the understanding, the example embodiments according to FIG. 12 may be explained referring to FIG. 1 and FIG. 11.

Specifically, FIG. 12 illustrates operations of the step S1160 to S1190 in FIG. 11. The integrated access point 150 and the multi-mode terminal 110 are connected with each other through the first type link and the second type link (S1204, S1204'). For better understanding, when there are first priority data, second priority data, and third priority data, it can be assumed that the first and second data are configured to be transmitted through the first type link, and the third priority data is configured to be transmitted through the second type link (e.g. a WiFi link). Also, it is assumed that the third priority data is transmitted with an 'AC-VI' when the second type link is a WiFi link (S1205).

The first and second type communication parts 160-1 and 160-2 of the integrated access point 150 reports service quality information for each priority data to the integrated layer processing part 172 (S1210, S1210'). For example, the service quality information may include transmission latency, delay jitter, transmission error rate, peak SNR, and the like.

If a service quality of the first priority data is lower than a first threshold value (S1220), the integrated layer processing part 172 may move some priority data (e.g. the second priority data) to the second type link in order to enhance the service quality of the first priority data, and change QoS mapping of the second type link. For example, the access category of the second priority data may be set to 'AC_VI', and the access category of the third priority data may be downgraded into 'AC_BE'.

The integrated layer processing part 172 transfers information on the changed data distribution and QoS mapping to the communication parts 162-1 and 162-2 (S1225, S1225'). The first type communication part 160-1 may transfer the changed information to the multi-mode terminal 110 (S1230). The first type communication part 120-1 of the multi-mode terminal 110 which receives the changed information reports the received information to the integrated layer processing part 132 (S1235). In response to the information, the integrated layer processing part 132 changes QoS mapping information of the second type communication part 120-2 (S1235').

Then, on the receipt of the reports of service quality information for each priority data (S1240, S1240'), if the service quality of the first priority data is higher than a second threshold value (S1250), the integrated layer processing part 172 may move some priority data (e.g. the second priority data) to the first type link in order to enhance service quality of next priority data (i.e. the second priority data), and change QoS mapping of the second type link. For example, the access category of the third priority data may be upgraded into 'AC_VI'. The changed data distribution and QoS mapping may be applied to the integrated access point and the multi-mode terminal by using procedure identical to the above-described steps (S1255, S1255', S1260, S1265, and S1265'), and data may be transmitted according to the corresponding configuration (S1267).

Also, on the receipt of the reports of service quality information for each priority data (S1270, S1270'), if the service quality of the first priority data is higher than the second threshold value, and all data can be transmitted by using only the first type link (S1280), the integrated access point 150 may transmit all priority data (i.e. the first to third priority data) through only the first type link (S1297). The changed data distribution and QoS mapping may be applied to the integrated access point and the multi-mode terminal by using procedure identical to the above-described steps (S1285, S1285', S1290, S1295, and S1295').

The persons skilled in the art may easily understand the steps constituting the process and method according to the present invention may be executed with an order different from the execution order explained in this disclosure. Also, two or more steps may be merged into a single step, or any step can be expanded with a further step and operation without damaging the fundamentals of the disclosed example embodiments.

In the example embodiments, any one of operations and processes described in this disclosure can be implemented in instruction code stored in a computer-readable medium. The instruction code may be executed by at least one processor of a mobile apparatus, a network element and/or any other computing apparatus.

While the example embodiments of the present invention and their advantages have been described in detail, it should be understood that various changes, substitutions and alterations may be made herein without departing from the scope of the invention. Thus, the actual scope of the claimed subject matter of the present invention should be defined by the appended patent claims.

What is claimed is:

1. An operating method of a multi-mode terminal, the method comprising:
    connecting a first type link with a first type access point of an integrated access point;
    reading link setup information corresponding to the integrated access point from a memory, wherein the link setup information is used for configuring a second type link according to a first configuration method; and
    connecting a second type link with a second type access point of the integrated access point based on the link setup information,
    wherein the operating method further comprises:
        when the link setup information corresponding to the integrated access point does not exist in the memory, connecting the second type link with the integrated access point according to a second configuration method;
        generating the link setup information; and
        storing the generated link setup information in the memory,
    wherein the first configuration method comprises a part of all steps constituting the second configuration method, and a time needed for the first configuration method is shorter than a time needed for the second configuration method.

2. The method of claim 1,
    wherein the storing the generated link setup information in the memory comprises storing the generated link setup information in the memory as mapped onto a first type access point identifier of the integrated access point.

3. The method of claim 1, wherein the reading the link setup information comprises reading the link setup information which is mapped onto the first type access point identifier of the integrated access point from the memory.

4. The method of claim 1, wherein the first type link is a cellular communication link, and the second type link is a wireless local area network communication link.

5. The method of claim 4, wherein the first type access point includes a femtocell base station, and the second type access point includes a wireless fidelity (WIFI) access point, and the integrated access point includes an integrated femtocell base station.

6. An operating method of an integrated access point, the method comprising:
    connecting a first type link with a multi-mode terminal;
    reading link setup information corresponding to the multi-mode terminal from a memory, wherein the link setup information is used for configuring a second type link according to a first configuration method; and
    connecting a second type link with the multi-mode terminal based on the link setup information,
    wherein the operating method further comprises:
        when the link setup information corresponding to the multi-mode terminal does not exist in the memory, connecting the second type link with the multi-mode terminal according to a second configuration method;
        generating the link setup information; and
        storing the generated link setup information in the memory,
    wherein the first configuration method comprises a part of all steps constituting the second configuration method, and a time needed for the first configuration method is shorter than a time needed for the second configuration method.

7. The method of claim 6,
    wherein the storing the generated link setup information in the memory comprises storing the generated link setup information in the memory as mapped onto a first type terminal identifier of the multi-mode terminal.

8. The method of claim 6, wherein the reading comprises reading the link setup information which is mapped onto the first type terminal identifier of the multi-mode terminal from the memory.

9. An apparatus comprising:
    a first type communication part capable of communicating with a first type terminal;
    a second type communication part capable of communicating with a second type terminal;
    a memory storing link setup information used for configuring a second type link with the second type terminal according to a first configuration method; and
    a control part reading link setup information corresponding to a multi-mode terminal from the memory, and controlling the second type communication part to connect the second type link with the multi-mode terminal based on the link setup information, when a first type link with the multi-mode terminal is connected through the first type communication part,
        wherein, when the link setup information corresponding to the multi-mode terminal does not exist in the memory, the control part controls the second type communication part to connect the second type link with the multi-mode terminal according to a second configuration method, generates the link setup information, and stores the generated link setup information in the memory, wherein the first configuration method comprises a part of all steps constituting the second configuration method, and a needed for the first configuration method is shorter than a time needed for the second configuration method.

10. The apparatus of claim 9, wherein the control part determines whether link setup information mapped onto a first type terminal identifier of the multi-mode terminal provide from the first type communication part exists in the memory.

11. The apparatus of claim 9, wherein the control part stores the generated link setup information in the memory as mapped onto the first type terminal identifier.

12. An apparatus comprising:
a first type communication part capable of performing a first type communication;
a second type communication part capable of performing a second type communication;
a memory storing link setup information used for configuring a second type link according to a first configuration method; and
a control part reading link setup information corresponding to an integrated access point from the memory, and controlling the second type communication part to connect the second type link with the integrated access point based on the link setup information, when a first type link with the integrated access point is connected through the first type communication part, wherein, when the link setup information corresponding to the integrated access point does not exist in the memory, the control part controls the second type communication part to connect the second type link with the integrated access point according to a second configuration method, generates the link setup information, and stores the generated link setup information in the memory, wherein the first configuration method comprises a part of all steps constituting the second configuration method, and a time needed for the first configuration method is shorter than a time needed for the second configuration method.

13. The apparatus of claim 12, wherein the control part determines whether link setup information mapped onto a first type access point identifier of the integrated access point provided from the first type communication part exists in the memory.

14. The apparatus of claim 12, wherein the control part stores the generated link setup information in the memory as mapped onto the first type access point identifier.

* * * * *